US008876513B2

(12) United States Patent
Lim et al.

(10) Patent No.: US 8,876,513 B2
(45) Date of Patent: Nov. 4, 2014

(54) SELECTIVE DEPOSITION MODELING USING CW UV LED CURING

(75) Inventors: Jin Hong Lim, Waxhaw, NC (US); Hernando Vicente Angulo, Rock Hill, SC (US); John D. Clay, Charlotte, NC (US); Khalil Moussa, Charlotte, NC (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 12/109,491

(22) Filed: Apr. 25, 2008

(65) Prior Publication Data

US 2009/0267269 A1 Oct. 29, 2009

(51) Int. Cl.
*B29C 35/08* (2006.01)
*B29C 67/00* (2006.01)

(52) U.S. Cl.
CPC ......... *B29C 67/0059* (2013.01); *B29C 67/0066* (2013.01); *B29C 67/0088* (2013.01); *B29C 67/0077* (2013.01)
USPC ...................................... 425/174.4; 264/497

(58) Field of Classification Search
CPC ............ B29C 67/0066; B29C 67/0077; B29C 67/0088; B22F 2003/1058; B22F 2003/1057
USPC ........ 425/174.4, 375; 264/113, 497, 308, 401
See application file for complete search history.

(56) References Cited

U.S. PATENT DOCUMENTS

| | | | |
|---|---|---|---|
| 5,096,530 A | 3/1992 | Cohen | |
| 5,121,329 A | 6/1992 | Crump | |
| 5,136,515 A | 8/1992 | Helinski | |
| 5,141,680 A | 8/1992 | Almquist | |
| 5,170,127 A * | 12/1992 | Henley | .......................... 324/658 |
| 5,200,965 A * | 4/1993 | Okuyama et al. | ........ 372/29.022 |
| 5,204,055 A | 4/1993 | Sachs et al. | |
| 5,216,616 A | 6/1993 | Masters | |
| 5,266,244 A | 11/1993 | Yabe et al. | |
| 5,340,433 A | 8/1994 | Crump | |
| 5,340,656 A | 8/1994 | Sachs et al. | |
| 5,340,701 A | 8/1994 | Desobry | |
| 5,380,769 A | 1/1995 | Titterington et al. | |
| 5,387,380 A | 2/1995 | Cima | |
| 5,555,176 A | 9/1996 | Menhennett et al. | |
| 5,594,652 A | 1/1997 | Penn et al. | |

(Continued)

FOREIGN PATENT DOCUMENTS

| | | |
|---|---|---|
| EP | 0703036 | 3/1996 |
| GB | 2436539 | 10/2007 |

(Continued)

OTHER PUBLICATIONS

PCT International Search Report for International Application No. PCT/US/2009/041622.

(Continued)

*Primary Examiner* — Dimple Bodawala
(74) *Attorney, Agent, or Firm* — Keith Roberson

(57) ABSTRACT

A continuous-wave (CW) ultraviolet (UV) curing system for solid freeform fabrication (SFF) is provided, wherein the curing system is configured to provide an exposure of UV radiation for one or more layers of UV-curable material. One or more UV exposures may initiate curing of a curable material in the layer dispensed by a solid freeform fabrication apparatus. One approach to provide the single or multiple UV exposures is the use of one or more UV LEDs, which generate UV radiation without generating any substantial amounts of infrared (IR) radiation at the same time. This allows for the curing process to be energy efficient and also allows for the SFF system to be far less complex.

8 Claims, 16 Drawing Sheets

(56) References Cited

U.S. PATENT DOCUMENTS

| | | | |
|---|---|---|---|
| 5,647,931 | A | 7/1997 | Retallick et al. |
| 5,656,230 | A | 8/1997 | Khoshevis |
| 5,855,836 | A | 1/1999 | Leyden et al. |
| 5,866,058 | A | 2/1999 | Batchelder et al. |
| 5,922,364 | A | 7/1999 | Young, Jr. |
| 5,925,500 | A | 7/1999 | Yang et al. |
| 6,132,665 | A | 10/2000 | Bui et al. |
| 6,133,355 | A | 10/2000 | Leyden et al. |
| 6,214,276 | B1 | 4/2001 | Gelbart |
| 6,259,962 | B1 | 7/2001 | Gothait |
| 6,270,335 | B2 | 8/2001 | Leyden |
| 6,492,651 | B2 | 12/2002 | Kerekes |
| 6,562,269 | B2 | 5/2003 | Fong |
| 6,752,948 | B2 | 6/2004 | Newell et al. |
| 6,841,116 | B2 | 1/2005 | Schmidt |
| 6,841,589 | B2 | 1/2005 | Schmidt et al. |
| 6,850,334 | B1 | 2/2005 | Gothait |
| 6,863,859 | B2 | 3/2005 | Levy |
| 6,902,246 | B2 | 6/2005 | Varnon et al. |
| 6,916,441 | B2 | 7/2005 | Newell et al. |
| 6,927,018 | B2 | 8/2005 | Burgess |
| 6,936,212 | B1 | 8/2005 | Crawford |
| 7,137,696 | B2 | 11/2006 | Siegel |
| 7,270,528 | B2 | 9/2007 | Sherwood |
| 2002/0016386 | A1 | 2/2002 | Napadensky |
| 2002/0105114 | A1* | 8/2002 | Kubo et al. ............ 264/497 |
| 2003/0063138 | A1 | 4/2003 | Fong |
| 2003/0067098 | A1 | 4/2003 | Newell et al. |
| 2003/0209836 | A1 | 11/2003 | Sherwood |
| 2004/0207124 | A1* | 10/2004 | Kritchman et al. .......... 264/401 |
| 2004/0238111 | A1* | 12/2004 | Siegel ................. 156/275.5 |
| 2005/0169962 | A1* | 8/2005 | Bhatia et al. ................ 424/423 |
| 2005/0253308 | A1 | 11/2005 | Sherwood |
| 2005/0288813 | A1* | 12/2005 | Yang et al. ................... 700/119 |
| 2006/0119686 | A1 | 6/2006 | Odell |

FOREIGN PATENT DOCUMENTS

| | | |
|---|---|---|
| JP | 2007-190811 | 8/2007 |
| WO | WO 97/11837 | 4/1997 |
| WO | WO 00/11092 | 3/2000 |
| WO | WO 01/26023 | 4/2001 |
| WO | WO 01/68375 | 9/2001 |
| WO | WO 2004009318 | 1/2004 |

OTHER PUBLICATIONS

"UV LED Cure-All Linear 100 UV LED: Test Equipment and Setup", Wright Industries Report, dated Mar. 20, 2006; www.uvprocess.com/products.

"Con-Trol-Cure: UV LED Cure-All Linear 100", UV Process Supply Datasheet, 2005; www.uvprocess.com/products.

PCT Written Opinion of the International Searching Authority for PCT/US/2009/041622.

English Translation of Japan's First Office Action for Japanese Application No. 2011-506473 dated Aug. 20, 2013 (2 pages).

English Translation of China's First Office Action for Chinese Application No. 200980121424.0 dated Dec. 31, 2012 (8 pages).

English Translation of China's Second Office Action for Chinese Application No. 200980121424.0 dated Jul. 10, 2013 (7 pages).

English Translation of China's Third Office Action for Chinese Application No. 200980121424.0 dated Feb. 7, 2014.

Shark Series High Flux UV LED Illuminators, OTLH-0480-UV, Product Description, from Opto Technology, Inc., dated May 25, 2006.

Metrolight Smart Electronic Ballast for HID, Operating Specifications dated 2007.

Specifications for Nichia Chip Type UV LED Model: NCSU033A(T), from Nichia Corporation.

Studer, et al. "Overcoming Oxygen Inhibition in UV-curing of Acrylate Coatings by Carbon Dioxide Inerting, Part I", Progress in Organic Coatings, vol. 48, pp. 92-100 (2003).

"Design Consideration for High-Stability Pulsed Light Systems," by Robert A. Capobianco, from website: http://opto.perkinelmer.com/library/papers/tp1.htm, Printed on Feb. 20, 2002.

Vurdering af UV—haerdende trykfarver og—lakker I et samlet miljoperspektiv (translated as—"Evaluation of UV Hardened Printer's Ink and Lacquer in a Comprehensive Environmental Perspective," by the Danish Environmental Protection Agency, published 1999, website www.mst.dk/udgiv/publikationer/1999/87-7909-190-3/html/samfat.sub.--eng.h- tm.

"UV—Flash Curing and Its Applications," by A. Stohr and J. Renschke, website http://www.radcurenet.de/rte99/stoehr/stoehr.htm, Printed on: Feb. 20, 2002.

"How UV Flash Curing Works," by Sylve Ericsson, Svecia USA Inc., website http://www.screenweb.com/graphics/cont/flashuv2.htm, May 1, 2002.

"Optical Pump Sources," website http://repairfaq.physik.tu-berlin.de/sam/laserssl.htm#sslsfm, Printed on: Feb. 20, 2002.

"Application of a Flash Lamp Apparatus for DVD Bonding Process," by Shoei Ebisawa, Koyshi Ohshima, Norio Tunematu, and Keiichi Hashimoto, website: http://www.dic.co.jp/tech/rep0403/, RadTech Asia 1997.

\* cited by examiner

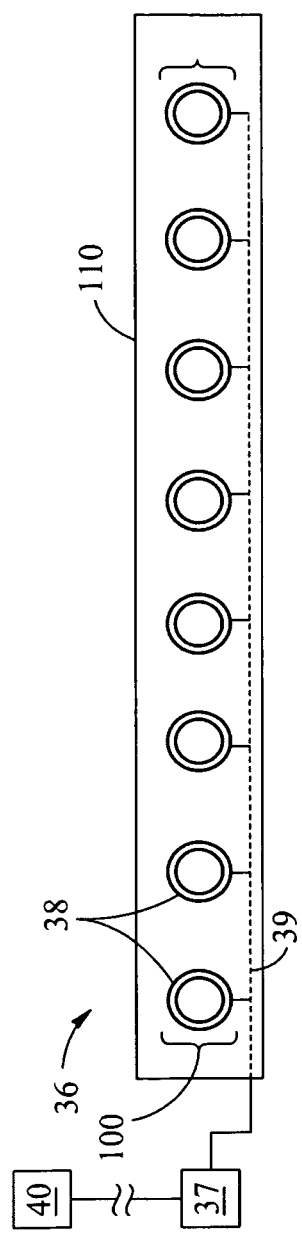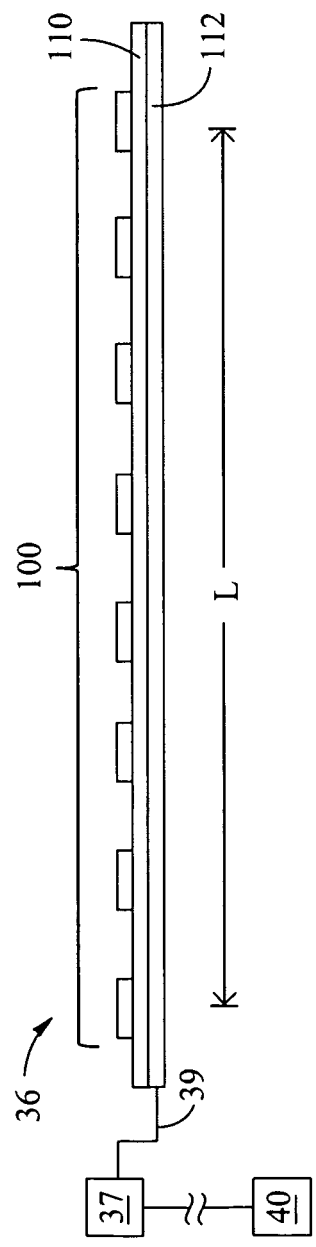

SELECTIVE DEPOSITION MODELING USING CW UV LED CURING

FIELD OF THE INVENTION

The present invention relates in general to solid freeform fabrication, and in particular to methods, systems and apparatus for selective deposition modeling using continuous ultraviolet (UV) radiation to cure layers of a build material to form three-dimensional structures or objects.

BACKGROUND OF THE INVENTION

Several technologies are used for rapidly creating solid, three-dimensional models, prototypes, and parts for limited-run manufacturing. These technologies are generally called Solid Freeform Fabrication (SFF) techniques and include stereolithography, selective deposition modeling (SDM), three-dimensional printing, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion, as opposed to conventional fabrication techniques, which are generally subtractive in nature.

In most SFF techniques, three-dimensional objects are formed in a layer-by-layer manner by solidifying or curing successive layers of a build material. For example, in stereolithography a tightly focused beam of energy, typically in the ultraviolet radiation band, is scanned across a layer of a liquid photopolymer build material to selectively cure the build material to form an object. In SDM, a build material is typically jetted or dropped in discrete droplets, or extruded through a nozzle, to solidify on contact with a build platform or previous layer of solidified material to build up a three-dimensional object in a layerwise fashion. Other names for SDM used in the SFF industry are solid object imaging, solid object modeling, fused deposition modeling, selective phase area deposition, multi-phase jet modeling, three-dimensional printing, thermal stereolithography, selective phase area deposition, ballistic particle manufacturing, fused deposition modeling, and the like.

Ballistic particle manufacturing is disclosed in, for example, U.S. Pat. No. 5,216,616 to Masters. Fused deposition modeling is disclosed in, for example, U.S. Pat. No. 5,340,433 to Crump. Three-dimensional printing is disclosed in, for example, U.S. Pat. No. 5,204,055 to Sachs et al. A thermoplastic material having a low-melting point is often used as the solid modeling material in SDM, which is delivered through a jetting system such as an extruder or print head. One type of SDM process that extrudes a thermoplastic material is described in, for example, U.S. Pat. No. 5,866,058 to Batchelder et al. One type of SDM process that utilizes ink jet print heads is described in, for example, U.S. Pat. No. 5,555,176 to Menhennett et al.

Recently, there has developed an interest in utilizing curable materials in SDM. One of the first suggestions of using a radiation-curable build material in SDM is found in U.S. Pat. No. 5,136,515 to Helinski, wherein it is proposed to selectively dispense a UV curable build material in an SDM apparatus. Some of the first UV curable material formulations proposed for use in SDM apparatuses are found in Appendix A of International Patent Publication No. WO 97/11837, where three reactive material compositions are provided. More recent teachings of using curable materials in various selective deposition modeling systems are provided in U.S. Pat. No. 6,259,962 to Gothait; U.S. Pat. No. 5,380,769 to Titterington et al; U.S. Pat. Nos. 6,133,355 and 5,855,836 to Leyden et al; U.S. Pat. App. Pub. No. US 2002/0016386 A1; and International Publication Numbers WO 01/26023, WO 00/11092, and WO 01/68375.

These curable materials generally contain photoinitiators and photopolymers which, when exposed to ultraviolet radiation (UV), begin to cross-link and solidify. Often these curable materials contain non-curable components, which enable the materials to solidify after being dispensed prior to being cured. This property is needed so that the selectively dispensed material will maintain its shape before being exposed to ultraviolet radiation.

For SDM apparatuses that selectively dispense curable materials, it is desirable to initiate curing of the dispensed material by a flood exposure to UV radiation. However, developing a flood UV exposure system that effectively initiates curing in these materials has proven problematic. When the photoinitiators in the thin layers are excited by exposure to UV radiation, they release free radicals that are intended to react with the photopolymers and initiate the polymerization (curing) process. Because of the wide area of exposure of these thin layers to the atmosphere, the free radicals tend to react with the oxygen in the atmosphere instead of reacting with the photopolymers to initiate curing. This cure-hindering phenomena is known as "oxygen inhibition," which can undesirably reduce or prevent the polymerization process from occurring. Oxygen inhibition is effectively non-existent in stereolithography since the tightly focused beam of UV radiation triggers a large instantaneous release of free radicals over a small region. The region is so small that the free radicals lack the opportunity to react with the oxygen in the atmosphere. However, oxygen inhibition is a significant problem in SDM applications where a broad planar flood exposure is desired to initiate the curing process. Although this phenomena can be overcome by submersing the SDM build environment in an inert gas, providing such a system adds additional complexity and expense to an SDM apparatus.

Most UV lamps used in curing photopolymers that provide a planar exposure of UV radiation are typically mercury-halide lamps, metal halide lamps, or mercury-xenon lamps. These lamps are continuous-running lamps that generate high levels of heat in order to produce the levels of UV radiation necessary to trigger polymerization. Undesirably, the high levels of heat generated by these lamps pose significant problems in SDM. For instance, the heat generated by these lamps can thermally initiate curing of the material in the SDM dispensing device or material delivery system, thereby rendering the apparatus inoperable. Alternatively, the heat may also prevent the dispensed material from solidifying prior to being exposed to UV radiation. If such constantly emitting lamps are used in SDM, the high levels of heat they generate may require special active cooling systems to be incorporated into the system to make the system operable. Not only is the amount of power consumed by these lamps to maintain the emission substantial, but they also have long warm up times which necessitates that they be constantly operated. Thus, they typically require some sort of mechanical shutter system in order to control the duration of the exposure in SDM apparatuses while the lamps are operated continuously. Further, experiments with constant UV emitting lamps not only demonstrate that they consume significant amounts of power, typically around 1500 Watts, but also that many curable formulations would not cure due to oxygen inhibition.

Flash curing systems have recently become available that generate high peak power pulses of ultraviolet radiation for curing. Although these commercially available systems are capable of overcoming the problem of oxygen inhibition, they are generally not practical for use in SDM. For example, commercially available power supplies for use in charging these pulse systems have large input power requirements, often around 40 kilowatts or more. These power supplies, initially designed to power laser systems, need more than about 1000 watts of input power to operate, and typically require a line voltage of 240 VAC or greater. Thus, these flash curing systems operate at power levels that are too high to be useful in SDM apparatuses. For SDM applications a lower power consumption flash curing system is needed, but not available.

More recently, an inexpensive, low power, flash curing system for SDM has been proposed in U.S. Patent Application Ser. No. 2003/0209836, assigned to the assignee of the present invention. This flash curing system is capable of initiating polymerization of selectively dispensed curable materials without detrimentally affecting the layer-by-layer SDM build process. While having many advantages, the flash curing system still relies on lamps that generate significant amounts of energy in the infrared (IR) region of the electromagnetic spectrum and also still consume relatively large amounts of power. Also, the system requires additional complexity to create the multiple light pulses.

SUMMARY OF THE INVENTION

A first aspect of the invention is a method of forming a three-dimensional object in a layerwise manner in a build environment. The method comprises generating computer data corresponding to at least one layer of the object; dispensing a curable material in the build environment according to the computer data to form the at least one layer of the object; supporting the dispensed material in the build environment on a build platform; and exposing the dispensed material of the at least one layer to an exposure of ultraviolet (UV) radiation from a light source to cure the dispensed material. The light source generates radiation that is substantially free of infrared (IR) radiation.

A second aspect of the invention is a continuous-wave (CW) ultraviolet (UV) curing system for curing a UV-curable material deposited in sequential layers. The CW UV curing system comprises one or more UV LEDs that emit CW UV radiation and a power supply configured to provide power to the one or more LEDs and to control the operation of the one or more LEDs so as to provide exposures for the deposited layers.

A third aspect of the invention is a selective deposition modeling (SDM) apparatus for forming a three-dimensional object from a curable material in a build environment. The SDM apparatus receives data corresponding to layers of the three-dimensional object. The SDM apparatus comprises a platform configured to support the three-dimensional object in the build environment and a dispensing device arranged relative to the platform and configured to dispense the curable material in the build environment according to the computer data to form the layers of the three-dimensional object. The SDM apparatus further comprises a continuous-wave (CW) ultraviolet (UV) light source disposed relative to the platform and configured to irradiate the layers with UV radiation that initiates curing of the dispensed material. The CW UV light source does not substantially produce infrared (IR) radiation.

Additional aspects, features, and advantages of the invention will be set forth in the detailed description that follows, and in part will be readily apparent to those skilled in the art from that description or recognized by practicing the invention as described herein, including the detailed description that follows, the claims, as well as the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

FIGS. 4A and 4B are schematic plan and side close-up views of an example embodiment of the CW UV curing system of the present invention illustrating an example linear configuration of the UV LEDs;

DETAILED DESCRIPTION OF THE INVENTION

Figure 1:
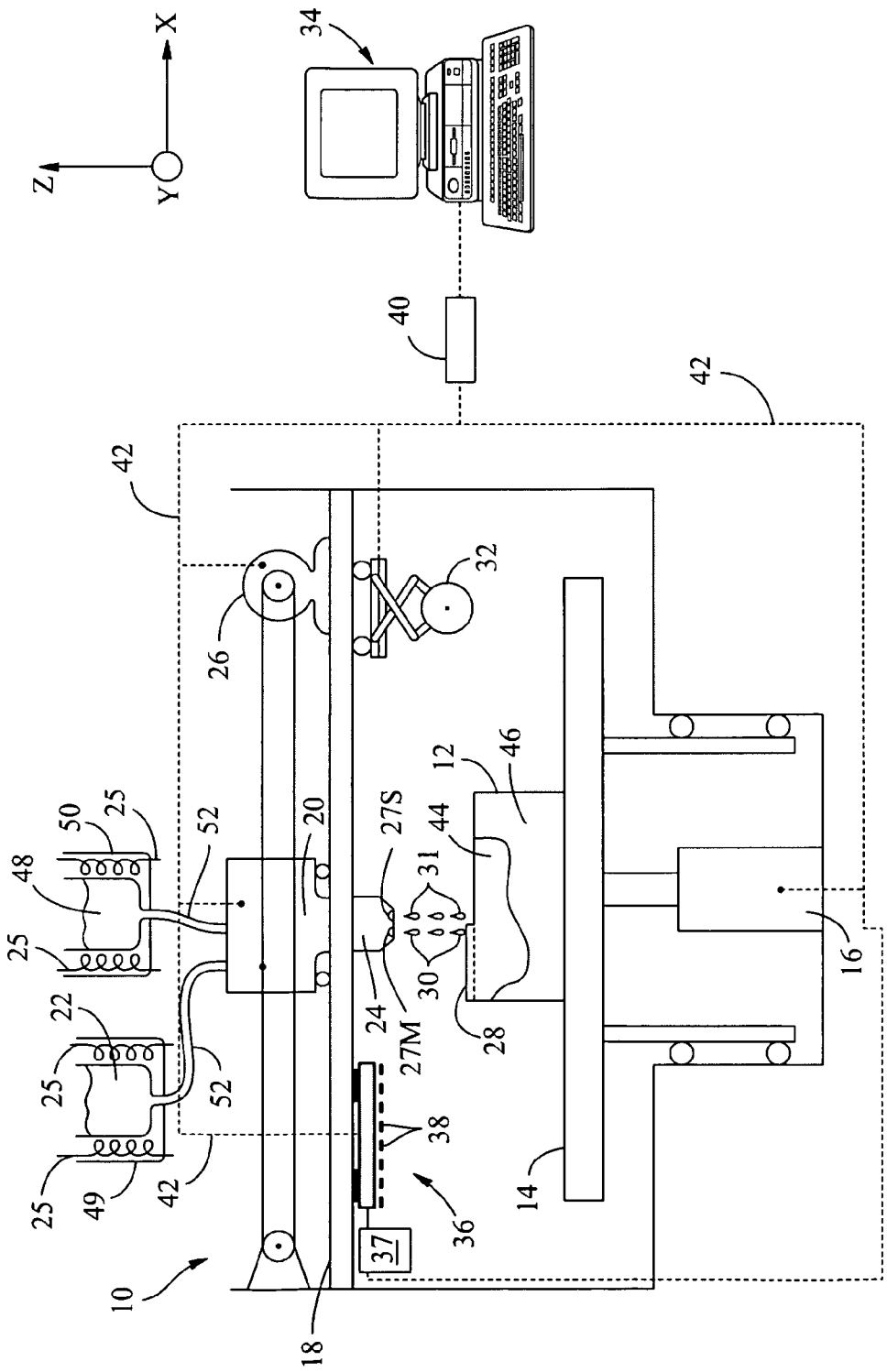
FIG. 1 is a diagrammatic side view of a SDM apparatus incorporating the continuous-wave (CW) ultraviolet (UV) curing system of the present invention.

The present invention relates in general to solid freeform fabrication (SFF), and in particular to methods, systems and apparatus for selective deposition modeling using continuous ultraviolet (UV) radiation to cure layers of a build material to form three-dimensional objects. The continuous UV radiation is provided by a continuous-wave UV curing system. While the continuous-wave (CW) UV curing system of the present invention is applicable to all SFF techniques that use a curing system to cure a build material, the invention is described hereinbelow by way of illustration, and not limitation, with respect to an SDM apparatus utilizing an ink jet print head dispensing a UV-curable phase-change material.

Terms And Definitions

The term "continuous wave" is abbreviated as "CW" and is used in optics to distinguish a light source that generates a continuous light from one that generates pulses or flashes of light.

The term "build material" or "material" as used herein describes all resin and other materials dispensed by the dispensing device in order to build the three-dimensional object. The build material includes not only the material or materials that constitutes the object being built by the SFF technique, but also any support material and/or support structure that is dispensed to support the object being built and that may ultimately be separated from the object in a post-process operation or the like. However, it should be appreciated that even if a material is described as being dispensed in certain embodiments of the present invention, the dispensed material is not necessarily required to be cured, such as in the case of non-curable phase change support materials described below to provide one non-limiting example.

As used herein, the term "a flowable state" of a build material is a state wherein the material is unable to resist shear stresses that are induced by a dispensing device, such as those induced by an ink jet print head when dispensing the material, causing the material to move or flow. In certain embodiments of the present invention, the flowable state of the build material is a liquid state. However, the flowable state of the build material may also exhibit thixotropic-like properties. The term "solidified" and "solidifiable" as used herein refer to the phase change characteristics of a material where the material transitions from the flowable state to a non-flowable state.

Also as used herein, a "non-flowable state" of a build material is a state wherein the material is sufficiently self-supportive under its own weight so as to hold its own shape. A build material existing in a solid state, a gel state, or paste state, are examples of a non-flowable state of a build material for the purposes herein.

In addition, the term "cured" or "curable" refers to any polymerization reaction. In certain embodiments of the present invention, the polymerization reaction is triggered by controlled exposure to actinic radiation or thermal heat. In further embodiments of the present invention, the polymerization reaction involves the cross-linking of monomers and oligomers initiated by exposure to actinic radiation in the UV wavelength band.

Further, the term "cured state" refers to a material, or portion of a material, in which the polymerization reaction has been substantially completed. It is to be appreciated that as a general matter the material can easily transition between the flowable and non-flowable state prior to being cured; however, once cured, the material cannot transition back to a flowable state and be dispensed by the apparatus.

Temperature Considerations

It has been discovered that it is desirable to maintain low temperatures such as around 40° C. in the build environment of SDM apparatuses that dispense radiation-curable materials in certain embodiments of the present invention. This is due to a variety of related reasons, of which the most significant reason is to prevent thermal initiation of the cure process when the material is in the flowable state prior to being dispensed. This is to be avoided because thermal initiation of the cure process can clog the dispensing device causing the apparatus to malfunction. Still further, maintaining lower temperatures in the SDM apparatus is important since the polymerization cure process produces a significant amount of exothermal heat from the three-dimensional object being formed. This heat, in addition to the heat already present in the material after solidification of previous layers, must be kept to a minimum and/or be removed so that subsequent layers of dispensed material will be able to solidify after being dispensed and not remain in the flowable state and run off the object. As is seen below, the CW UV curing system of the present invention mitigates the adverse effects of heating by avoiding the generation of IR radiation.

Example Curable Phase Change Materials

A number of radiation-curable phase change formulations have been developed for being dispensed by a dispensing device, such as a Z850 print head available from Xerox Corporation of Wilsonville, Oreg. The components of four exemplary build material formulations are provided by weight percent in Table 1, below.

TABLE 1

| Mfg. ID No. | General Component Name | Ex. 1 | Ex. 2 | Ex. 3 | Ex. 4 |
|---|---|---|---|---|---|
| CN980 | Urethane Acrylate | 7.2% | | | 6.5% |
| CN981 | Urethane Acrylate | | | 26% | |
| E3200 | Epoxy Acrylate | | | 14% | 6.0% |
| CN975 | Hexafunctional Urethane Acrylate | | 7.2% | | |
| CN2901 | Urethane Acrylate | 27.5% | 27% | | 18.7% |
| SR203 | Tetrahydrofurfuryl Methacrylate | | | | |
| SR205 | Triethylene glycol dimethacrylate | 33% | | 46.5% | 41.05% |
| SR340 | 2-phenoxyethyl methacrylate | | | | |
| SR313 | Lauryl methacrylate | | 18% | | |
| SR454 | Ethoxylated₃ Trimethylolpropane Triacrylate | | 4.5% | | |

TABLE 1-continued

| Mfg. ID No. | General Component Name | Ex. 1 | Ex. 2 | Ex. 3 | Ex. 4 |
|---|---|---|---|---|---|
| SR604 | polypropylene glycol monomethacrylate | | | | 12.0% |
| CD406 | Cyclohexane dimethanol diacrylate | | | 30% | |
| SR493D | Tridecyl Methacrylate | 19% | | | |
| ADS038 | Urethane wax | 7% | 5.3% | 10% | 10.0% |
| ADS043 | Urethane wax | 4.3% | 6% | 1.5% | 2.0% |
| I-184 | Photo-initiator | 2% | 2% | 2% | 3.75% |
| TOTAL | | 100% | 100% | 100% | 100.0% |

The following components used in the four formulations listed in Table 1 are available from Sartomer Company, Inc. of Exton, Pa., under the following designations: CN 980, CN 981, CN 975, CN 2901, SR 203, SR 205, SR 340, SR 313, SR 454, CD 406, SR 604, and SR 493D. The components ADS 038 and ADS 043 are available from American Dye Source, Inc. of Quebec, Canada. The epoxy acrylate under the designation E 3200 is available from UCB Chemical, Inc. of Atlanta, Ga. The photoinitiator under the designation I-184 listed is available from Ciba Specialty Chemicals, Inc. of New York, N.Y. The formulation in example 4 of Table 1 (hexafunctional urethane acrylate) is desirable in some situations since it was determined to be the most durable.

A non-curable phase change support material was also developed to be dispensed from the same dispensing device as the curable phase change build material. The support material formulation comprises 70% by weight octadecanol available from Ruger Chemical Co., Inc., of Irvington, N.J., and 30% by weight of a tackifier sold under the designation of KE 100 available from Arakawa Chemical (USA) Inc., of Chicago, Ill. Further details pertaining to the build and support materials are found in U.S. patent application Ser. No. 09/971,247 assigned to the assignee of the present invention.

The support material may alternatively be a thermoplastic phase change material such as that disclosed in U.S. Pat. No. 6,132,665 to Bui et al. Alternatively, the support material may be a water-soluble material, if desired, which may include a fluorosurfactant to lower the surface tension of the material to improve the drop shape and cohesion of the jetted material. In addition, the material may be a gel material, such as gelatin that can be wiped away from the object, if desired. In addition, the support material may exhibit mechanically weak properties so it can be easily crumbled away from the three-dimensional object.

SDM Apparatus with CW UV Curing System

Figure 2:
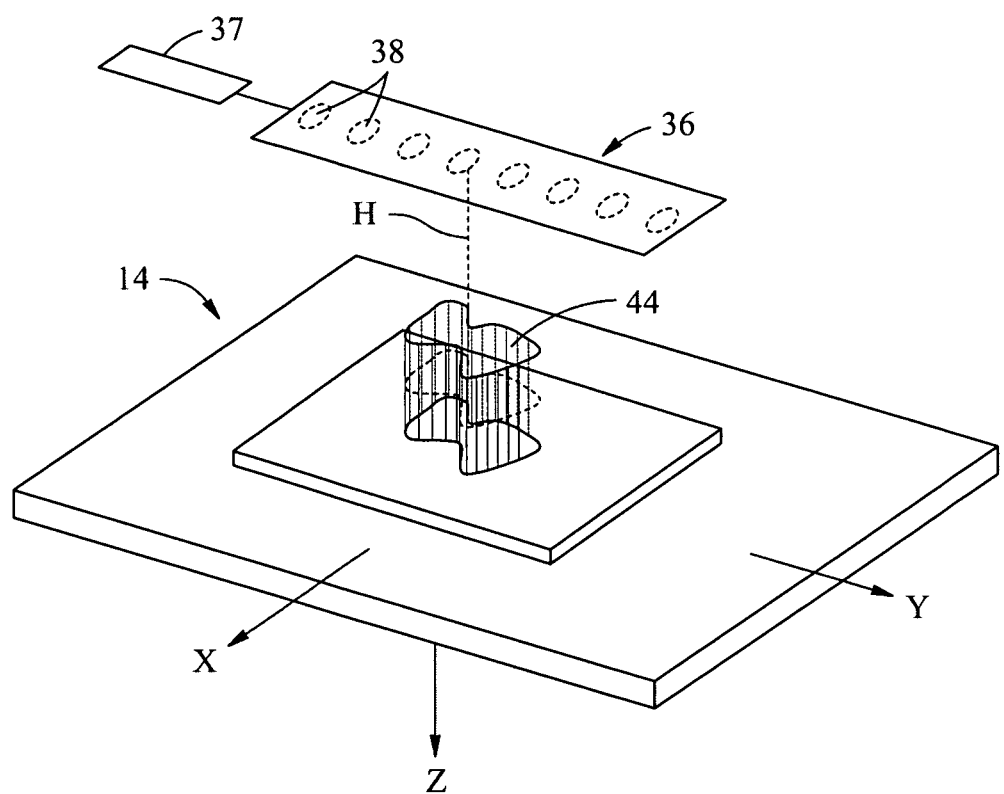
FIG. 2 is a close-up perspective view of platform 14 illustrating a "dog bone" type object and the platform degrees of freedom.

FIG. 1 is a schematic diagram of an SDM apparatus 10 that includes an example embodiment of the CW UV curing system 36 (or "CW UV light source") of the present invention. The SDM apparatus 10 is shown building a three-dimensional object 44 on a support structure 46 in a build environment 12. The object 44 and support structure 46 are built in a layer by layer manner on a build platform 14 that can be precisely positioned vertically by any conventional actuation device 16, which in FIG. 1 generally comprises a pneumatic or hydraulic cylinder, but in further embodiments may comprise any actuation device that raises and lowers the build platform. FIG. 2 is a close-up perspective view of platform 14 illustrating a "dog bone" type object 44 and the platform degrees of freedom as shown by X-Y-Z Cartesian coordinates.

Directly above and parallel to the platform 14 is a rail system 18 on which a material dispensing trolley 20 resides carrying a dispensing device 24. In certain embodiments of the present invention, the dispensing device 24 is an ink jet print head that dispenses a build material and support material and is of the piezoelectric type having a plurality of dispensing orifices. However, other ink jet print head types could be used, such as an acoustic or electrostatic type, if desired. Alternatively, a thermal spray nozzle could be used instead of an ink jet print head, if desired. An example dispensing device 24 is the aforementioned piezoelectric Z850 print head. The material dispensed from the Z850 print head desirably has a viscosity of between about 13 to about 14 centipoise at a dispensing temperature of about 80° C. The dispensing methodology of this system is described in greater detail in U.S. patent application Ser. No. 09/971,337 assigned to the assignee of the present invention. Further embodiments of the present invention comprise alternative dispensing devices.

The trolley 20 of FIG. 1 carrying the dispensing device 24 is fed the curable phase change build material 22 from a remote reservoir 49. The remote reservoir is provided with heaters 25 to bring and maintain the curable phase change build material in a flowable state. Likewise, the trolley 20 carrying the dispensing device 24 is also fed the non-curable phase change support material 48 from remote reservoir 50 in the flowable state. In order to dispense the materials, a heating device is provided to initially heat the materials to the flowable state, and to maintain the materials in the flowable state along its path to the dispensing device. In an example embodiment, the heating device comprises heaters 25 on both reservoirs 49 and 50, and additional heaters (not shown) on the umbilicals 52 connecting the reservoirs to the dispensing device 24.

Located on the dispensing device 24 are discharge orifices 27M and 27S for respectively dispensing build material 30 and support material 31. Discharge orifices 27M and 27S are adapted to dispense their respective materials to any desired target location in the build environment 12.

The dispensing device 24 is reciprocally driven on the rail system 18 along a horizontal path (i.e., along the X-axis) by a conventional drive device 26 such as an electric motor. In some embodiments of the present invention, the trolley carrying the dispensing device 24 takes multiple passes to dispense one complete layer of the materials from discharge orifices 27M and/or 27S.

Layers 28 are sequentially deposited to form object 44. In FIG. 1, a portion of a layer 28 of dispensed build material 30 is shown as the trolley has just started its pass from left to right. FIG. 1 shows the formation of an uppermost layer 28. A bottom-most layer 28 (not shown) resides adjacent platform 14. Dispensed build-material droplets 30 and support material droplets 31 are shown in mid-flight, and the distance between the discharge orifice and the layer 28 of build material is greatly exaggerated for ease of illustration. The layer 28 may be all build material, all support material, or a combination of build and support material, as needed, in order to form and support the three-dimensional object.

The build material and support material are dispensed as discrete liquid droplets in the flowable state, which solidify upon contact with the layer 28 as a result of a phase change. Alternatively, the materials may be dispensed in a continuous stream in an SDM apparatus, if desired. Each layer 28 of the object 44 is divided into a plurality of pixels on a bit map, in which case a target location is assigned to the pixel locations of the object for depositing the curable phase change material 22. Likewise, pixel coordinates located outside of the object may be targeted for deposition of the non-curable phase change support material 48 to form the supports for the object 44 as needed. Generally, once the discrete liquid droplets are deposited on all the targeted pixel locations of the bit map for a given layer, the dispensing of material for forming the layer is complete, and an initial thickness of layer 28 is established. In certain embodiments of the present invention, the initial layer thickness is greater than the final layer thickness.

Figure 3:
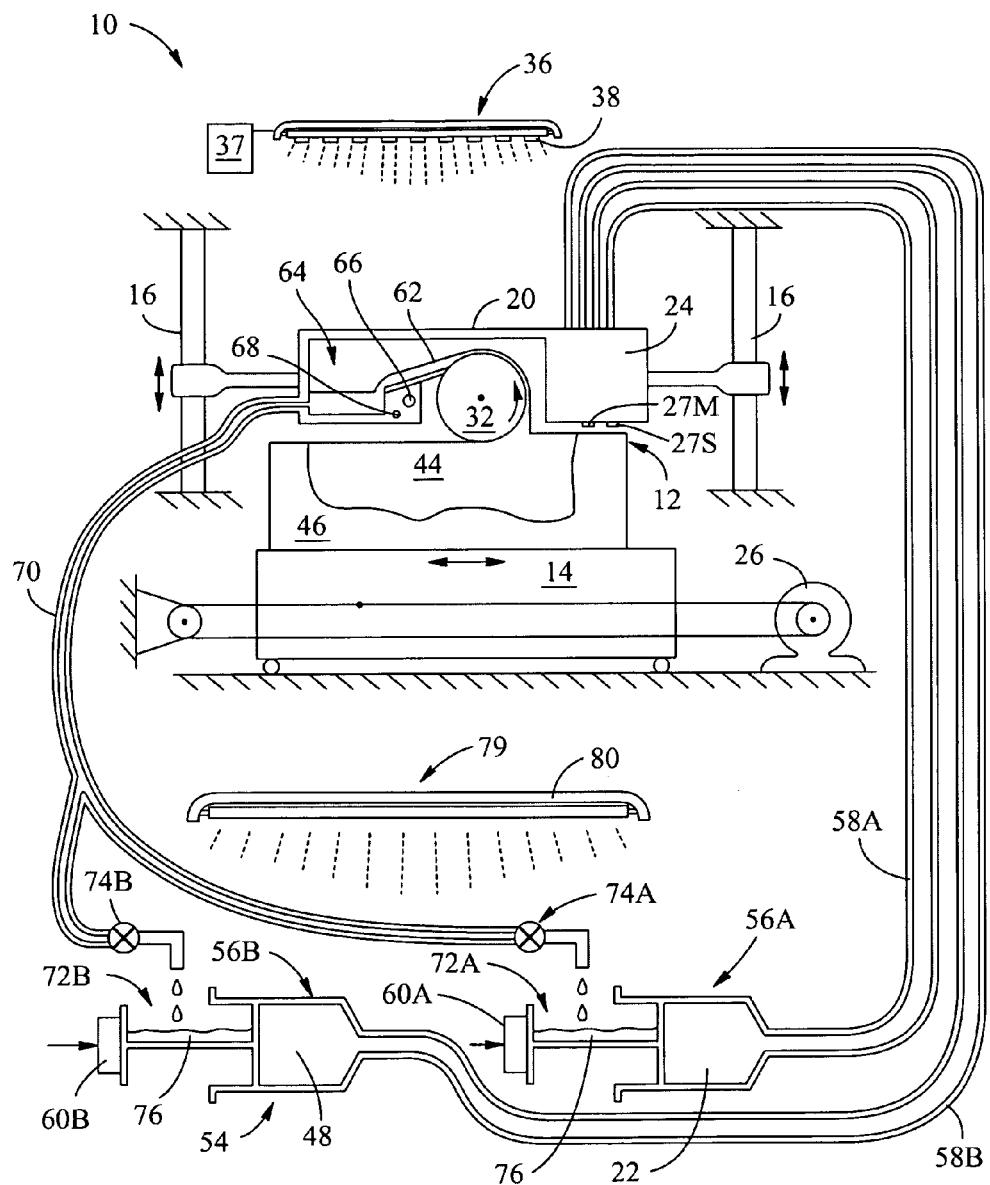
FIG. 3 is a diagrammatic side view of an exemplary embodiment of a SDM apparatus incorporating the CW UV curing system of the present invention.

A planarizer 32 is then drawn across the layer to smooth the layer and normalize the layer to establish the final layer thickness (see FIG. 3, discussed below). The planarizer 32 is used to normalize the layers as needed in order to eliminate the accumulated effects of drop volume variation, thermal distortion, and the like, which occur during the build process. It is the function of the planarizer to melt, transfer, and remove portions of the dispensed layer of build material in order to smooth it out and set a desired thickness for the last formed layer prior to curing the material. This ensures a uniform surface topography and layer thickness for all the layers that form the three-dimensional object and the support structure. However, it produces waste material that must be removed from the system. The planarizer 32 may be mounted to the material dispensing trolley 20 (as shown in FIG. 3) if desired, or mounted separately on the rail system 18 (as shown in FIG. 1). Alternatively, the layers can be normalized by utilizing capillary action to remove excess material, as disclosed in U.S. patent application Ser. No. 09/754,870, assigned to the assignee of the present invention, or an active surface scanning system that provides feedback data that can be used to selectively dispense additional material in low areas to form a uniform layer as disclosed in U.S. patent application Ser. No. 09/779,355, also assigned to the assignee of the present invention.

A waste collection system (not shown in FIG. 1; see FIG. 3) is used to collect the excess material generated during planarizing. The waste collection system may comprise an umbilical that delivers the material to a waste tank or waste cartridge, if desired. A waste system for curable phase change materials is disclosed in U.S. patent application Ser. No. 09/970,956, assigned to the assignee of the present invention.

In an example embodiment, the CW UV curing system 36 of the present invention is mounted on rail system 18. The CW UV curing system 36 is reciprocally driven along rail system 18 so that it can irradiate a just-dispensed layer of material onto object 44 or support structure 46. The CW UV curing system 36 includes at least one and, in certain embodiments, a plurality of UV light-emitting diodes (LEDs) 38 which is/are used to provide a planar (flood) exposure of relatively narrow-band UV radiation to each layer as needed.

The UV exposure is executed in a continuous (i.e., non-pulsed) manner, with the planarizer retracted from the build area when the continuous exposure occurs. Although the CW UV curing system 36 is shown reciprocally mounted on rail system 18, it may be mounted directly on the dispensing trolley, if desired. It is important to shield the dispensing device and planarizer from exposure to UV radiation by the CW UV curing system so as to prevent curing of material in the dispensing orifices or on the surface of the planarizer, either of which would ruin the build process and damage the apparatus. The CW UV curing system 36 and the one or more UV LEDs 38 that make up the system are described in greater detail below.

With continuing reference to FIG. 1, an external computer 34 generates or is provided with (e.g., via a computer-readable medium) a solid modeling CAD data file containing three-dimensional coordinate data of an object to be formed. Typically the computer 34 converts the data of the object into surface representation data, most commonly into the STL file format. In certain embodiments of the present invention, the computer also establishes data corresponding to support regions for the object. When a user desires to build an object, a print command is executed at the external computer in which the STL file is processed, through print client software, and sent to the computer controller 40 of the SDM apparatus 10 as a print job. The processed data transmitted to the computer controller 40 can be sent by any conventional data transferable medium desired, such as by magnetic disk tape, microelectronic memory, network connection, or the like. The computer controller processes the data and executes the signals that operate the apparatus to form the object. The data transmission route and controls of the various components of the SDM apparatus are represented as dashed lines at 42.

Once the three-dimensional object 44 is formed, the support material 48 from support structure 46 is removed by further processing. Generally, application of thermal heat to bring the support material back to a flowable state is needed to remove substantially all of the support material from the three-dimensional object. This can be accomplished in a variety of ways. For example, the part can be placed in a heated vat of liquid material such as in water or oil. Physical agitation may also be used, such as by directing a jet of the heated liquid material directly at the support material. This can be accomplished by steam cleaning with appropriate equipment. Alternatively, the support material can also be removed by submersing the material in an appropriate liquid solvent to dissolve the support material. Specific details on support material removal are disclosed in U.S. patent application Ser. No. 09/970,727 and U.S. patent application Ser. No. 10/084,726, both of which are assigned to the assignee of the present invention.

Another Example Embodiment of the SDM Apparatus

FIG. 3 illustrates another example embodiment of SDM apparatus 10 incorporating an embodiment of the CW UV curing system 36 of the present invention. SDM apparatus 10 is shown including schematically a material feed and waste system illustrated generally by numeral 54. In contrast to the SDM apparatus 10 shown in FIG. 1, the build platform 14 in the SDM apparatus of FIG. 3 is reciprocally driven by the conventional drive device 26 instead of the dispensing trolley 20. The dispensing trolley is precisely moved by actuation device 16 vertically to control the thickness of the layers of the object. In the embodiment of FIG. 3, the actuation device 16 comprises precision lead screw linear actuators driven by servomotors. The ends of the linear actuators 16 reside on opposite ends of the build environment 12 and in a transverse direction to the direction of reciprocation of the build platform. However, for ease of illustration in FIG. 3 they are shown in a two-dimensionally flat manner giving the appearance that the linear actuators are aligned in the direction of reciprocation of the build platform 14. Although they may be aligned with the direction of reciprocation, they may be situated in a transverse direction in certain embodiments so as to optimize the use of space within the apparatus.

In the build environment 12 resides a three-dimensional object 44 in the process of being formed and having integrally formed supports 46. The object 44 and supports 46 both reside in a sufficiently fixed manner on the build platform 14 so as to sustain the acceleration and deceleration effects during reciprocation of the build platform while still being removable from the platform. It is desirable to dispense at least one complete layer 28 of support material (see FIG. 1) on the build platform 14 before dispensing the build material since the support material is designed to be removed at the end of the build process.

The curable phase change build material identified by numeral 22 is dispensed by the SDM apparatus 10 to form the three-dimensional object 44, and the non-curable phase change support material identified by numeral 48 is dispensed to form the support 46. Containers identified generally by numerals 56A and 56B, respectively, hold a discrete amount of these two materials 22 and 48. Umbilicals 58A and 58B, respectively, deliver the material to the dispensing device 24. The materials 22 and 48 are heated to a flowable state, and heaters (not shown) are provided on or in the umbilicals 58A and 58B to maintain the materials in the flowable state as they are delivered to the dispensing device 24. In the illustrated SDM apparatus, the ink jet print head is configured to dispense both materials from a plurality of dispensing orifices 27M and 27S so that both materials can be selectively dispensed in a layerwise fashion to any target location in any layer being formed. When the dispensing device 24 needs additional material 22 or 48, extrusion bars 60A and 60B are respectively engaged to extrude the material from the containers 56A and 56B, through the umbilicals 58A and 58B, and to the dispensing device 24.

The dispensing trolley 20 shown in FIG. 3 comprises a heated planarizer 32 that removes excess material from the layers to normalize the layers being dispensed. The heated planarizer contacts the material in a non-flowable state and because it is heated, locally transforms some of the material to a flowable state. Due to the forces of surface tension, this excess flowable material adheres to the surface of the planarizer, and as the planarizer rotates the material is brought up to the skive 62 which is in contact with the planarizer 32. The skive 62 separates the material from the surface of the planarizer 32 and directs the flowable material into a waste reservoir, identified generally by numeral 64 located on the trolley 20. A heater 66 and thermistor 68 on the waste reservoir 64 operate to maintain the temperature of the waste reservoir at a sufficient point so that the waste material in the reservoir remains in the flowable state.

The waste reservoir is connected to a heated waste umbilical 70 for delivery of the waste material to the waste receptacles 72A and 72B. The waste material is allowed to flow via gravity down to the waste receptacles 72A and 72B. Although only one umbilical 70 with a splice connection to each waste receptacle is shown, alternative embodiments of the present invention provide a separate waste umbilical 70 between the waste reservoir 64 and each waste receptacle 72A and 72B. For each waste receptacle 72A and 72B, there is associated a solenoid valve 74A and 74B, for regulating the delivery of waste material to the waste receptacles. The valves 74A and 74B remain closed, and only open when the respective extrusion bars 60A and 60B are energized to remove additional material. A flash curing system 79 represented schematically as lamp or bulb 80 is provided to expose the waste material in the waste receptacles 76 (positioned between the extrusion bars and the containers) to radiation to cure the waste material in the waste receptacles. It should be appreciated that the waste materials of the embodiment of FIG. 3 are not mixed into the containers 56A and 56B and are simply disposed of when the containers 56A and 56B are replaced. A detailed discussion of the feed and waste system is disclosed in U.S. patent application Ser. No. 09/970,956 assigned to the assignee of the present invention.

CW UV Curing System

FIGS. 4A and 4B are schematic plan and side close-up views of an example embodiment of the CW UV curing system 36 of the present invention. CW UV curing system 36 generates one or more continuous (i.e., non-pulsed) exposures for each dispensed layer 28 to cure the dispensed build material. UV LEDs 38 may be turned off between exposures, but this does not constitute "pulsing" of the light source because each layer is continuously irradiated in a single exposure. Pulsed light sources typically operate at relatively high frequencies (e.g., 120 Hz), whereas the length of a continuous exposure using CW UV curing system 36 is on the order of at least one second or more.

Figure 4C:
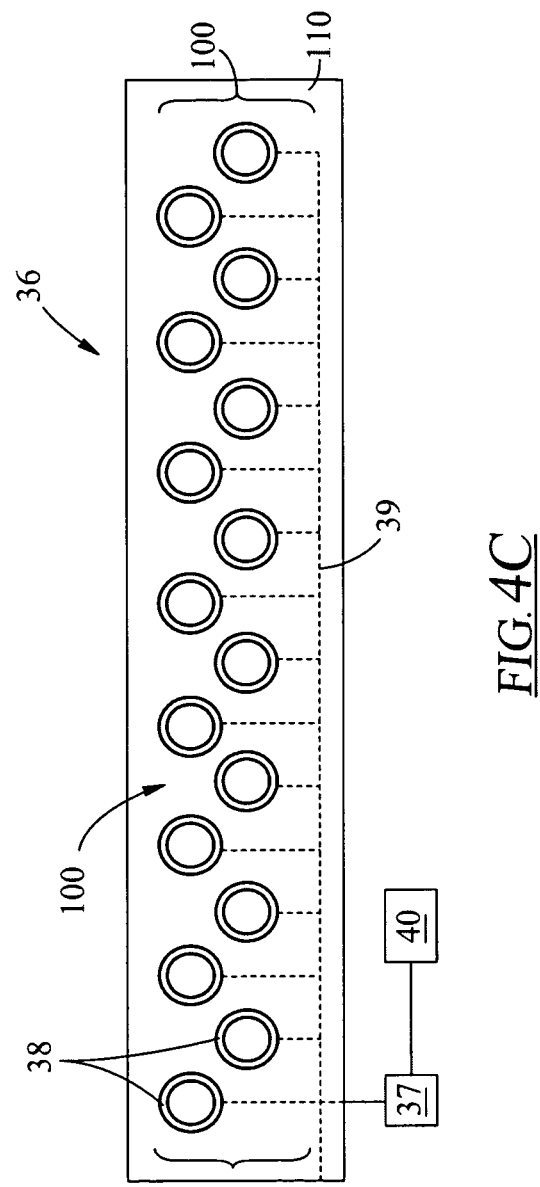
FIG. 4C is a plan view similar to that of FIG. 4A illustrating an example embodiment of a CW UV curing system that includes two offset rows of UV LEDs.

FIG. 4C is a plan view similar to that of FIG. 4A illustrating an example embodiment of a CW UV curing system that includes two offset rows of UV LEDs. Although two rows of eight UV LEDs are shown in the illustrated embodiment, it should be appreciated that any number of UV LEDs or other light sources in any configuration may be included along a length L, described below as the distance from center-to-center of the end UV LEDs, regardless of whether the end UV LEDs are in the same row or not (in FIG. 4C, the end UV LEDs are not in the same row).

CW UV curing system 36 includes at least one UV LED 38, and in the illustrated embodiment the CW UV curing system includes an array of two or more UV LEDs. In the example embodiment of FIGS. 4A and 4B, eight UV LEDs 38 are arranged in a linear array 100. Array 100 has a length L of 187 millimeters as measured center-to-center from the end UV LEDs 38. The eight UV LEDs 38 are equally spaced within this length so that the separation between adjacent UV LEDs is 27 millimeters (as measured from center-to-center). Each UV LED is soldered on a circuit board 110 having dimensions 270 mm×50 mm and that is configured with wiring 39 to deliver electrical power to the LEDs.

Circuit board 110 is mounted to a thin copper plate 1112 that dissipates heat. The dimensions of CW UV curing system 36 is sufficient to fully scan any sizes of samples/models on the platform of a ProJet™ 3-D modeler from 3D Systems, Inc., Rock Hill, S.C. CW UV curing system 36 includes or is otherwise operably connected to a power supply 37 that supplies electrical power to UV LEDs 38 via wiring 39 and that is adapted to control the operation of the UV LEDs to provide for the exposures for each layer 28. In an example embodiment, power supply 37 is electrically connected to computer controller 40, which controls the operation of the power supply, which allows the power supply to control the operation of CW UV curing system 36.

Figure 5:
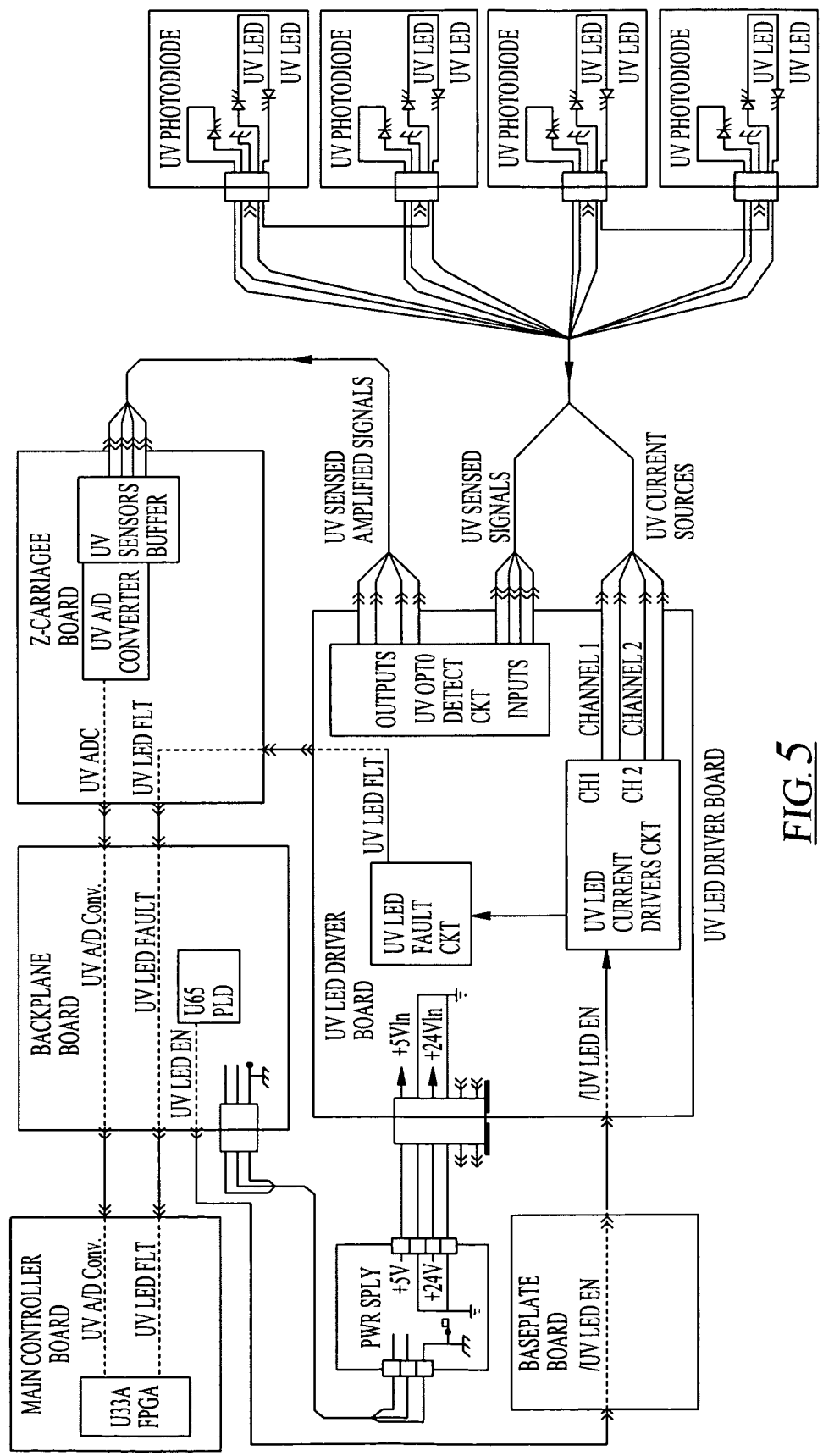
FIG. 5 is circuit diagram of certain components of a SDM apparatus in accordance with one embodiment of the present invention, wherein the SDM apparatus includes four modules comprising sets of two UV LEDs and a photodiode associated with each set of two UV LEDs.

Turning now to the circuit diagram of FIG. 5 of one exemplary embodiment of the present invention, a circuit diagram of certain components of a SDM apparatus in accordance with one embodiment of the present invention is illustrated. It should be appreciated that any appropriate circuit can be used with the apparatuses and methods of the present invention and that the invention is in no way limited to the architecture, components, and/or values described in FIG. 5. As shown on the right side of the circuit diagram of FIG. 5, the SDM apparatus includes four modules comprising sets of two UV LEDs and a photodiode associated with each set of two UV LEDs. The UV LED driver board contains the drive for the UV LEDs. Two channel (regulator) outputs of the quad DC/DC converter, operating as a constant-current source configured at 650 mA, act as the current source drivers for 8 high current UV LEDs for curing the build material. Inputs to these two operating channels may be tied together to form a single channel's signal. Drive control methods include direct on/off control. Channel 1 drives a string of 4 LEDs connected in series and channel 2 also drives a string of 4 LEDs connected in series.

When build material is dispensed from the dispensing device, the materials of the embodiment in accordance with FIG. 5 are cured one or more times per layer by enabling both current source drivers simultaneously. Signal low turns on both drivers. The programmable logic devices (PLD) on the backplane board generates the enable signal to activate all 8 LEDs. LEDs are logically enabled when the control program from the PLD set a logic "0" on to Pin 1 of the BUFFER via connector of UV LED driver board. Each of the two channels is designed to operate as a constant-current source for driving these high current LEDs.

The circuit diagram of FIG. 5 also illustrates four modules that include two LEDs each. The modules allow for simple and cost-effective replacement of LEDs in the event one or more LEDs require replacement, such that the entire array of LEDs does not need to be replaced if one or two LEDs fail or do not function properly. Furthermore, the modules also include a power detector that indirectly measures the UV radiation emitted by the one or more UV LEDs. The power detector indirectly measures the UV radiation by detecting the UV radiation that is received by the power detector after the UV radiation has reflected off surfaces within the build environment, including the build material, the platform, and other surfaces. The power detectors of the illustrated embodiment comprise photodiodes; however, further embodiments of the present invention include alternative power detectors, including but not limited to semiconductors, thermal detectors, quantum detectors, and the like. Turning again to the particular embodiment of FIG. 5, the photodiodes are employed to sense the light output of the UV LEDs. Since there are sets of two UV LEDs per module, one photodiode sensor is used to detect the UV radiation emitted primarily by the pair of UV LEDs. The photodiode will generate a current proportional to the light energy absorbed by the sensor of the photodiode. The photodiode outputs an electrical signal representing the amount of received radiation. Each photo-current from the four photodiodes is fed to an amplifier, one non-limiting example being an operational amplifier. The operational amplifier will amplify the current from sensors to an analog voltage signal. These analog signals are fed to an analog-digital converter (ADC) in the Z-carriage board which will digitize the analog voltage to enable the control and/or monitoring of the UV LEDs. In certain embodiments of the present invention, the power detector data can be used to determine the exposure time, the platform speed, and/or other parameters of operation of the SDM apparatus.

Figure 6A:
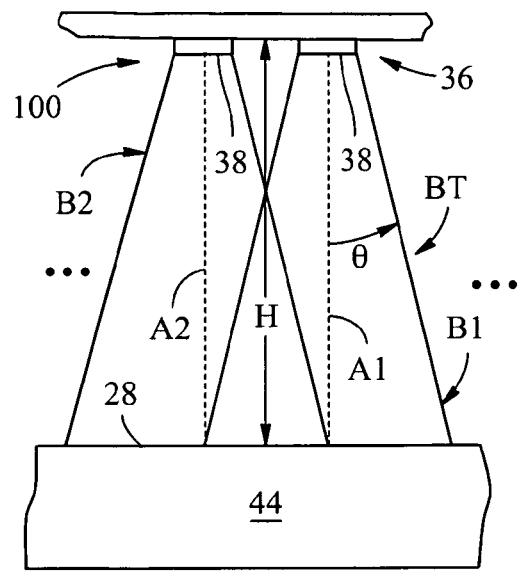
FIG. 6A is a close-up side view of a section of the CW UV curing system of the present invention along with object under construction, illustrating an example UV beam overlap at the object top layer and the height (H) of the CW UV system from the top layer.

FIG. 6A is a side view of CW UV curing system 36 showing radiation beams B1 and B2 associated with respective first and second UV LEDs 38 in array 100. Each UV LED 38 has a central axis A perpendicular to the LED surface. An array 100 having n UV LEDs 38 generates n beams Bn, (e.g., Beams B1, B2, . . . Bn) along n central axes An, wherein the n beams comprise a collective or "total" beam $B_T$ that irradiates layer 28.

Figure 6B:
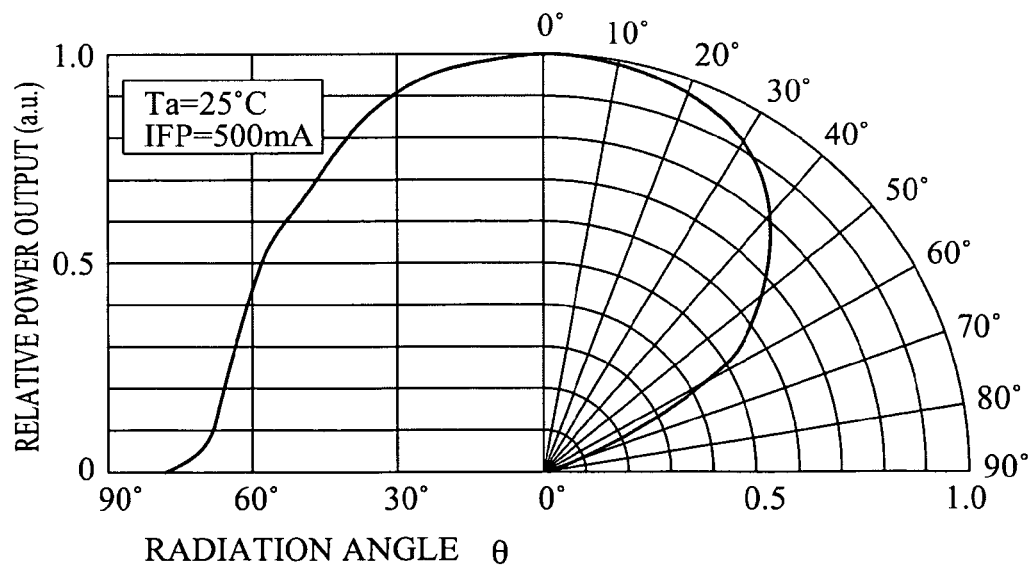
FIG. 6B is a plot of the directivity of example UV LEDs used in the CW UV curing system shown in FIG. 6A.

FIG. 6B is a polar diagram of the radiation pattern measured as optical power as a function of polar angle θ for a typical UV LED 38. The angle in polar diagram of FIG. 6B is measured relative to central axis A.

To obtain a sufficient overlap of power distribution on the build material surface, the height H of array 100 from the curing target surface (layer 28 of object 44) can be adjusted, and in an example embodiment was set to 21 mm from a calculation based on the divergence profile of each UV LED 38, as discussed below. With reference to FIG. 6A, height H is adjustable depending on the overlap target value. If the height H gets smaller, the overall power density on the surface gets higher but the overlap of the power distribution is not uniform because of the discrete UV LEDs 38. If the height H gets larger, the overall power density becomes lower but the overlap of the radiation at curing target surface (layer) 28 from UV LEDs increases. For the illustrated embodiment, the height H is from about 21 mm to about 18 mm. The power density provided by array 100 is roughly inverse-squarely proportional to the height H because the UV LEDs 38 radiate incoherently. In addition, the uniformity and quality of the cured results vary with this overlap and with power density. Thus, it is important to properly adjust height H because it directly influences the curing uniformity.

CW UV curing system 36 can have other geometries besides the linear array geometry shown in FIGS. 4A and 4B. Other geometries include, for example, a zig-zag arrangement, a curved arrangement, multiple arrayed lines, angled UV LEDs or array sections to provide a convergent beam and thus more concentrated power density, arranging the UV LEDs 38 in different planes to uniformize the radiation beam, and the like.

The number of UV LEDs 38 in array 100 is determined according to the power of each UV LED, height H, and the properties of the curing materials and/or the photo-initiators therein. For example, if the power of each UV LED 38 is higher than currently available power and/or if the photo-initiators absorb more photons in a given absorption band, then the number n of UV LEDs can be reduced and the height H between array 100 and the curing build material surface can be increased subsequently for a proper radiation overlap. The absorption of photons by layer 28 depends on the concentration of photo-initiators and so can be tailored for the particular SFF application.

In an example embodiment, each UV LED 38 has a peak wavelength 365 nm+/−5 nm, a bandwidth of about 15 nm, and an optical output power of about 200 mW along its central axis A (measured using a power meter, Ophr Head 20C-SH Controller 1Z01500) at a forward electrical current 600 mA, where the UV LED radiates in the way of a divergent profile, i.e., in the center or 0 degree the power is strongest, and as the angle from the center increases the power decreases. At angles θ of about 80° and larger, the power is low and eventually goes to zero, as shown in FIG. 6B.

Figure 7:
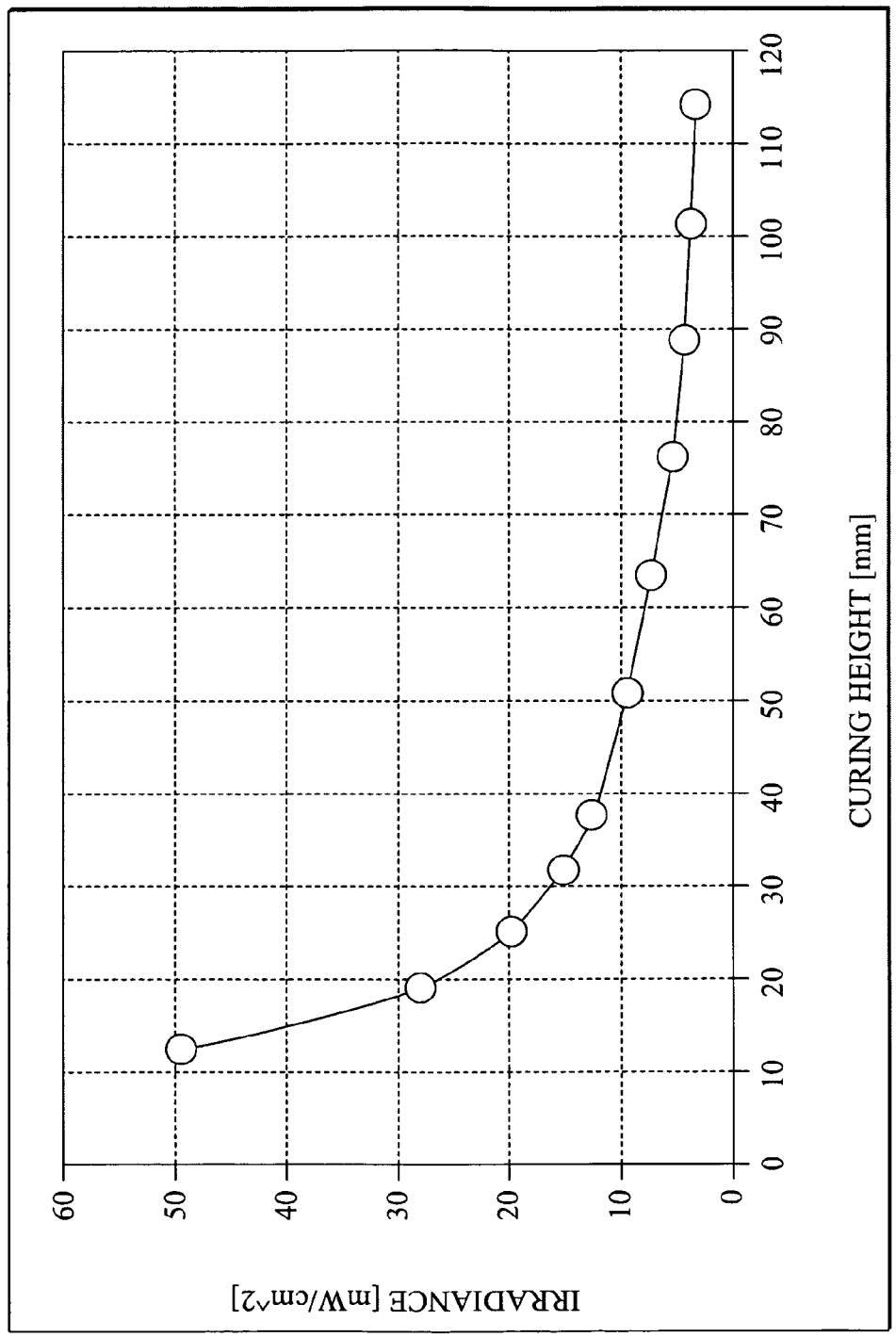
FIG. 7 is a plot of the Irradiance (milliwatts per square centimeter or mW/cm$^2$) as a function of Curing Height (mm) illustrating how the irradiance or optical power density decreases as the height between the UV LEDs and the build material increases in certain embodiments of the present invention.

FIG. 7 is a plot of the Irradiance (mW/cm$^2$) as a function of Curing Height (mm) illustrating how the irradiance or optical power density decreases as the height between the UV LEDs and the build material increases in certain embodiments of the present invention. The curing height, which is illustrated as H in FIGS. 2 and 6A for example, is determined from the desirable uniformity of overlap of LEDs and irradiance on the platform. As the height H is increased, the irradiance on the platform is decreased. The desirable irradiance (or optical power density) for certain embodiments of the present invention, such as with the UV LED spacing shown in FIG. 4A, is between 20 to about 30 mW/cm$^2$ with an 8 UV LED array, which would correspond to a height H of about 18 mm to about 25 mm. Still further embodiments of the present invention define alternative desirable irradiances based upon a number of parameters, including but not limited to LED power, LED spacing, the number of LEDs, build material properties, platform speed, and the like.

Figure 8:
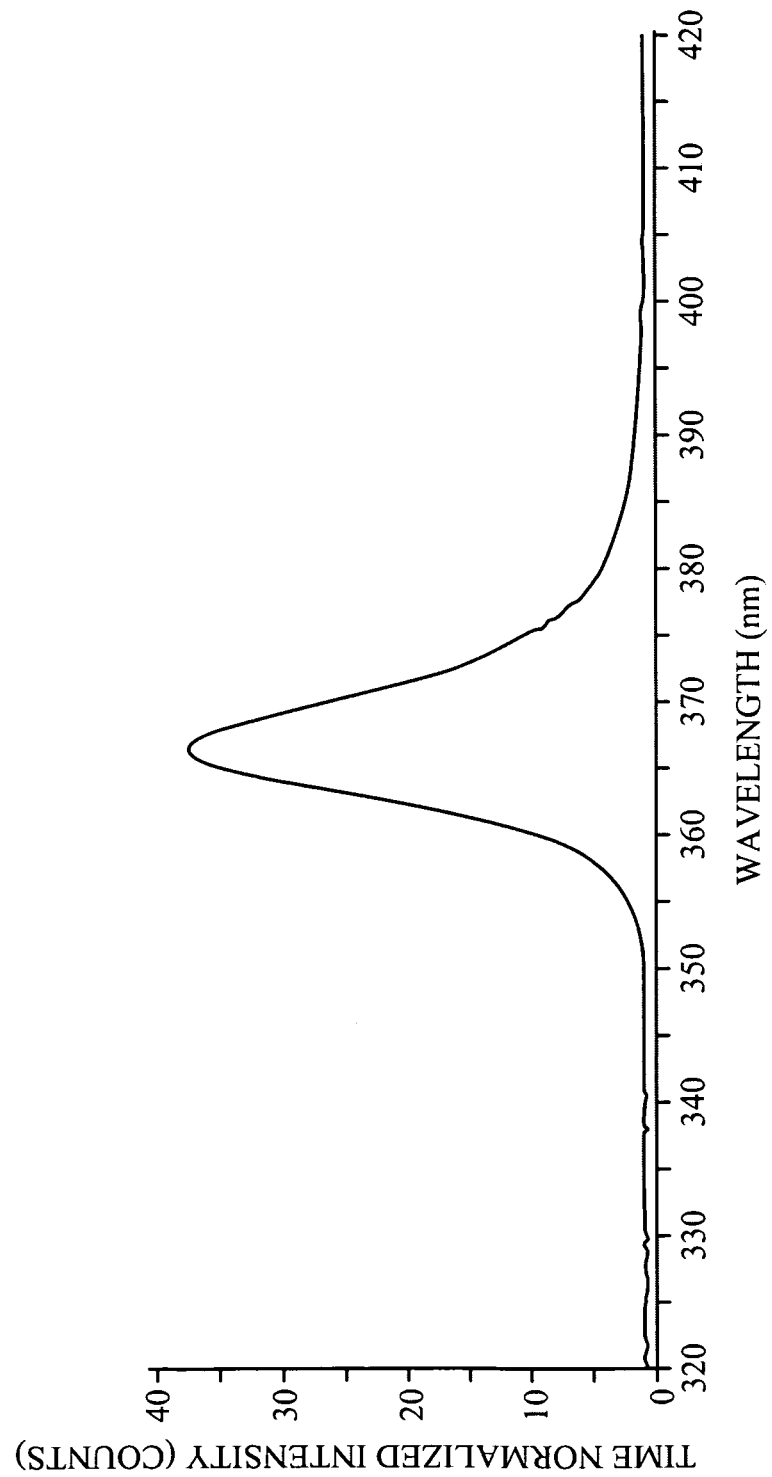
FIG. 8 is a plot of the Time Normalized Intensity (counts) vs. Wavelength (nm) illustrating the spectrum of the example UV LEDs used in the CW UV curing system of the present invention.

FIG. 8 is a plot of the measured Time Normalized Intensity (counts) vs. Wavelength (nm) illustrating the spectrum of example UV LEDs 38 used in an example embodiment of the CW UV curing system of the present invention. In this example embodiment, the spectrum of FIG. 8 indicates that the UV LEDs 38 are monochromatic with a peak wavelength 365±5 nm and a bandwidth of about 15 nm FWHM (full-width half-maximum). In further embodiments of the present invention, the UV LEDs define bandwiths that are greater than or less than 15 nm. Turning now to curing materials for use in certain embodiments of the present invention, such as the embodiment of FIG. 8, the absorption spectrum of a photo-initiator (Ciba, Irgacure 184) for the curing has an absorption peak ~240 nm and a broad band between about 230 and 375 nm at a concentration 4 or 5%, which is typical for curing materials. This absorption band covers most of the LED radiation spectrum and the absorbance is enough to cure the photo-sensitive materials by a moderate photon density.

Additionally, all the photons of this LED can be involved in the polymerization efficiently since the radiation band is within the material absorption band. Furthermore, the absorption of the curing material can be selected by judicious use of photo-initiators so that some of the photons pass through the curing layer to underlying layers, including at least one additional layer below the topmost layer (e.g. from top-most to bottom-most layer 28 in certain embodiments, which serves to cure or further cure the entire structure). Different concentrations of photo-initiators can be used to adjust the absorption band relative to the UV LED spectrum to optimize the curing process.

Note that FIG. 8 indicates that the UV LEDs 38 do not generate any infrared radiation when generating UV radiation, i.e., there is no or substantially no radiation having wavelengths of about 750 nm (the near-IR) or longer. That is to say, if any such IR radiation is generated, it is in an amount that is statistically insignificant.

Figure 9:
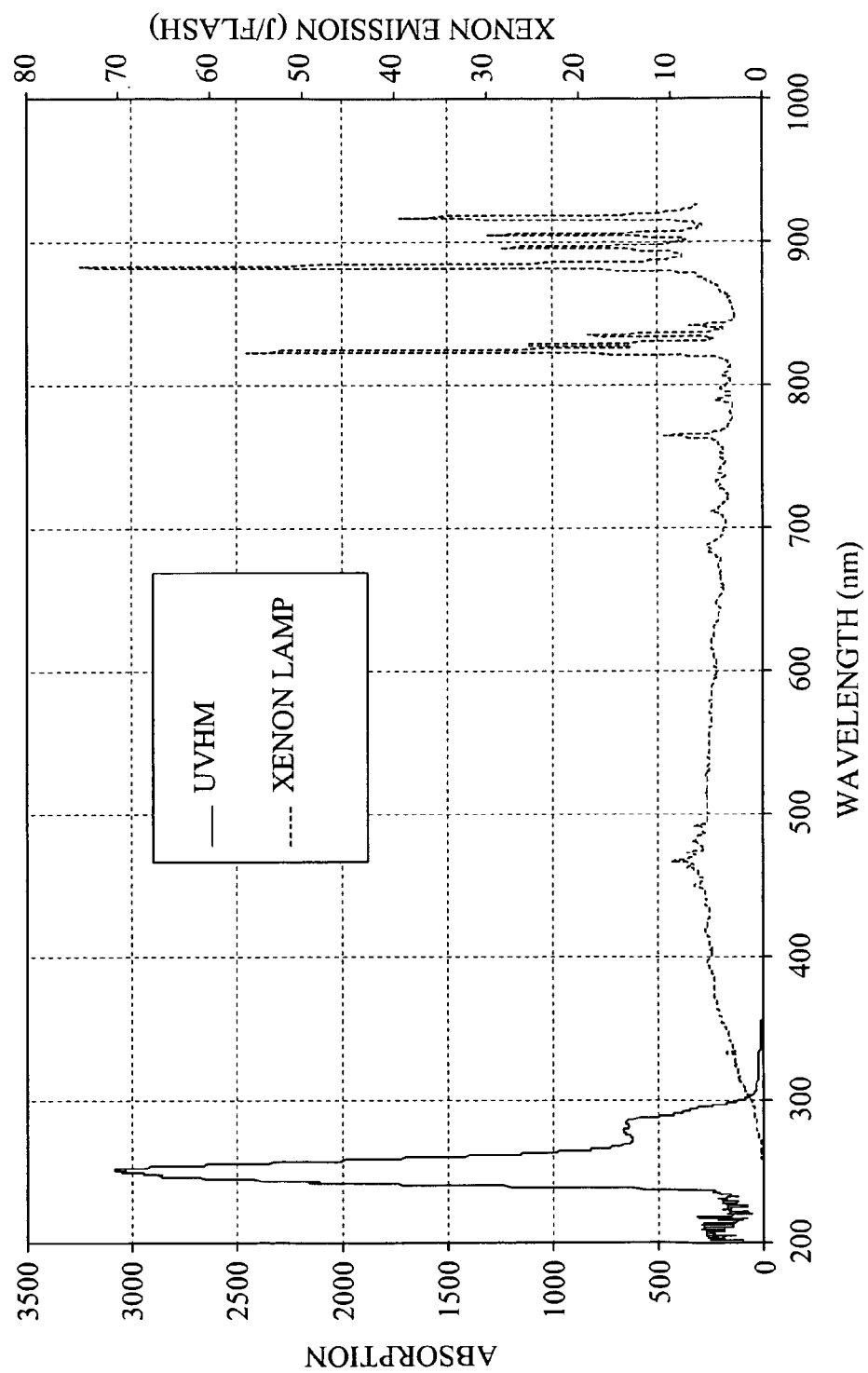
FIG. 9 is a plot of the absorption (left-hand vertical axis and dashed line) and Xenon Emission (j/flash)(right-hand vertical axis and solid line) as a function of Wavelength (nm) illustrating an example absorption spectrum of a curable build material (UV hot melt or "UVHM"), along with the Xenon lamp output spectrum.

FIG. 9 is a plot of the absorption (left-hand vertical axis and dashed line) and Xenon Emission (j/flash) (right-hand vertical axis and solid line) as a function of Wavelength (nm) illustrating an example absorption spectrum of a curable resin (UV hot melt or "UVHM") along with the Xenon lamp output spectrum;

A Xenon lamp radiates a fairly broad spectrum including visible and Infrared (IR) light, i.e., from ~250 nm to more than 1000 nm. Visible through IR wavelengths, however, are not usable for curing because the photo-initiator does not absorb light in this wavelength range. Furthermore, as can be seen in FIG. 9, the power density from a Xenon lamp at these unusable wavelengths is much higher than the amount of useful UV light generated. The large amounts of visible and IR light cause a temperature increase in the surface of the build material during the curing process, which adversely affects the curing or polymerization.

For curing in certain SDM apparatus of the present invention, the radiation power density should provide a sufficient number of photons within the absorption band of the photo-initiator to cure the build material as well as to form the desirable mechanical structure. Because of the relatively narrow UV emission spectrum of the UV LEDs, the photo-initiator can be tailored so that the absorption band overlaps the UV LED emission band by a select amount. The optical power of UV LEDs available from Opto Technology, Inc., of Wheeling, Ill., is measured to be about 60 mW at the nominal curing distance, and 165 mW on the front of the LEDs. These measurements can be taken with a standard detector having a diameter of 1 inch, wherein such detectors are available from Scientech, Inc. of Boulder, Colo. Alternatively, the total optical power of each UV LED available from Nichia Corporation of Japan is measured to be about 250 mW.

It can be seen from FIG. 9 that the Xenon lamp radiation only generates a small portion of its light in the UV range. The Xenon flash lamp has a very broad bandwidth of radiation emissions, between wavelengths of about 200 nm to about 1100 nm where most all of the emissions are between wavelengths about 250 nm to about 800 nm. However, the emissions that are utilized to generate free radicals from photo-initiators that initiate curing are generally in the ultraviolet radiation range of between about 200 nm to about 400 nm. Of the total ultraviolet emission range (200 nm to 400 nm) produced by the Xenon flash lamp only about 5% is in the short wavelength band UV-C and UV-B, which is between about 200 nm to about 300 nm. The other 95% is in the longer wavelength band, which is between about 400 nm to about 1000 nm. Consequently, most of the photons generated by the Xenon lamp are not absorbed by the photo-initiator, while the IR-wavelength photons end up heating the build material and increasing its surface temperature.

Sources of heat in SDM printing can be divided into three categories. A first source of heat is from electrical power consumption of the particular light source used for curing. This heat increases with the light source temperature as well as with the ambient temperature around the light source. The second heat source is from IR radiation absorbed by the build material but not the photo-initiator in the build material. The third heat source is from the exothermic reaction of polymerization during curing the build material. These heat sources directly influence the curing or polymerization by involving oxygen. Heat causes a change in the viscosity of the build material, which facilitates build material-oxygen combination. The high temperature results in low build material viscosity, which in turn results in the faster combination of the build material with more oxygen. It is therefore necessary to remove or reduce the oxygen content during the curing process for the polymerization to efficiently proceed.

A measurement was performed to compare the temperature distribution on the build material surface created by CW UV LEDs and by a pulsed Xenon lamp. The temperatures on the build material surface created by the UV LEDs and by the Xenon lamp were 28° C. and 54° C. respectively as compared to a room temperature of 26° C. over a period of 20 seconds. Despite the pulsing of the Xenon lamp, the temperature on the build material surface still increased significantly.

It was also noted that the electrical power consumption for a UV LED is about 3.3 W (8×3.3=26.4 W for eight UV LEDs), while that for a typical Xenon lamp typically ranges from 500 W to 1000 W. As a consequence, less effort and complexity is needed to reduce heating that arises from power consumption of the light source. It should also be noted that it may take many hours to build the final object 44 so that the electrical power consumption over time is much less for a CW-UV-based system 10 than a conventional Xenon-bulb-based system 10.

Oxygen Inhibition and Build Material Viscosity

Viscosity is closely related to oxygen inhibition in that the higher the viscosity the more oxygen inhibition takes place, but the phase should not be changed. An ideal method for oxygen inhibition is to perform curing in an inert-gas environment, such as nitrogen or carbon dioxide without oxygen. However, this adds complexity to the SDM apparatus. Another oxygen inhibition method is to provide high-intensity curing radiation for a short amount of time, such as is done with the aforementioned pulsed Xenon lamp approach. In the pulsed approach, the pulse width should be less than the diffusion time of oxygen to prevent free radicals from combining with oxygen molecules during curing.

"Curing time" is one of the critical parameters for curing in terms of the oxygen inhibition. The diffusion time of molecules is about a few milliseconds, depending on the build material viscosity—in general, the higher the viscosity, the slower the polymerization speed and diffusion. The free radical mechanism can be divided into three stages: initiation, propagation and termination. Initiation is the creation of free radicals necessary for propagation. The radicals can be created from radical initiators such as photo-initiators. The products formed are unstable and easily break down into two radicals. The free radicals use one electron from the pi bond to form a more stable bond with the carbon atom. The other electron returns to the second carbon atom, turning the whole molecule into another radical. Propagation is the rapid reaction of this radicalized molecule with another monomer, and the subsequent repetition of this reaction creates the repeating chain. Termination occurs when a radical reacts in a way that prevents further propagation.

Consequently, an ideal light source for curing should have the following properties. First, the light source should be monochromatic or should be within the absorption band of the photo-initiators for efficient curing. Second, the light source should have enough power density, i.e., provide enough photons to interact with photo-initiators and to subsequently build/form models with desirable mechanical properties. Third, the generation of heat, especially heat that raises the temperature of the build material surface, should be minimized. UV LEDs meet these properties.

Comparing UV LED Curing to Xenon Lamp Curing

The CW UV curing system 36 was tested in a 3-D modeler by installing the system in the place of the Xenon lamp assembly. Experiments were performed to compare the mechanical properties of samples cured by the CW UV curing system 36 and a conventional Xenon lamp.

After assembling the UV LED array 100 on the 3-D modeler, samples (i.e., test objects 44) were built according to the usual SDM methods and process. The shape and size for the samples were in a CAD window prepared based on ASTM (American Society for Testing and Materials) rules, called "Dog Bones," as illustrated by object 44 in FIG. 2.

Figure 10:
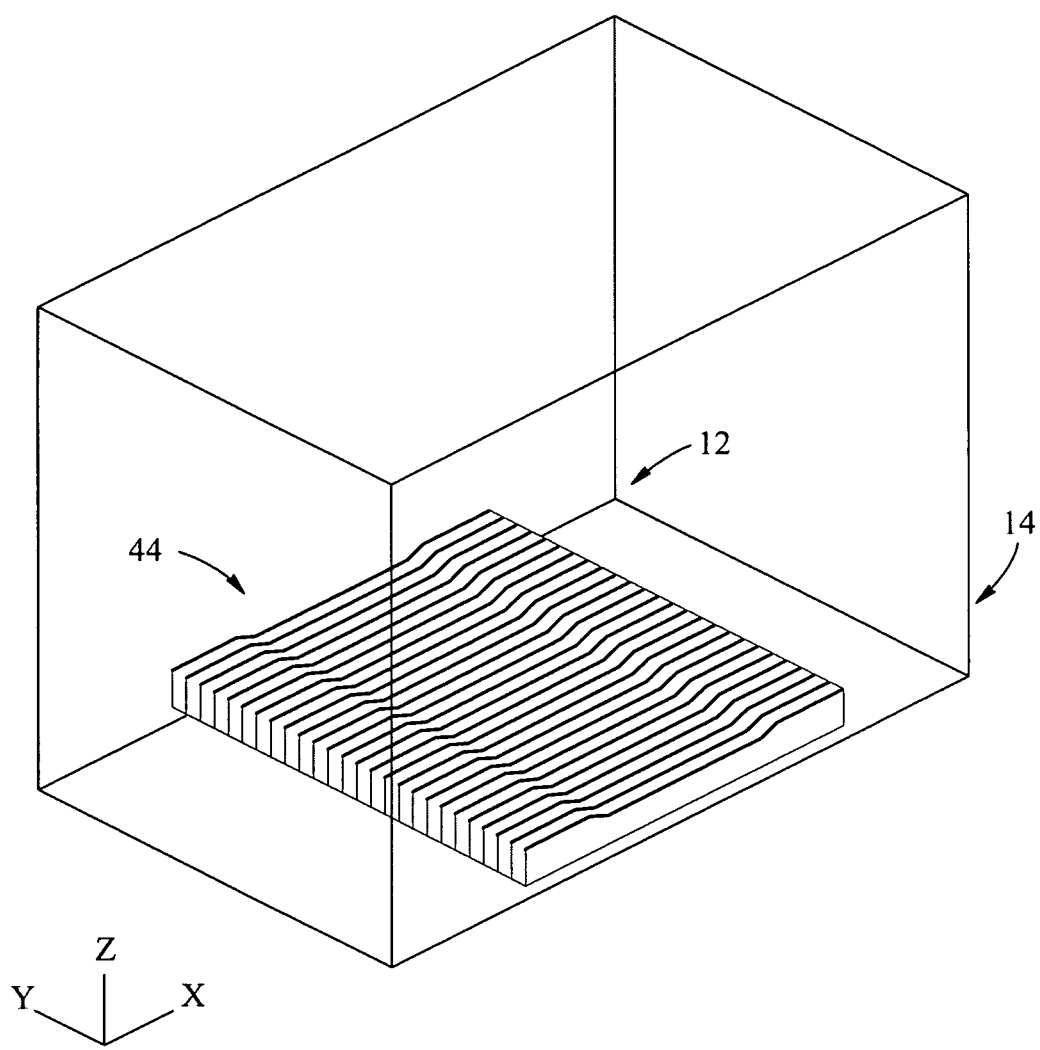
FIG. 10 is a schematic diagram of the platform illustrating the configuration of samples used in testing the CW UV curing system of the present invention.

A set of twenty or twenty-six samples 44 were formed equally spaced across the Y-axis and along X-axis on platform 14, as illustrated in FIG. 10. Samples 44 were also stacked layer by layer in the X-Z direction to minimize any mechanical printer errors. It took about six hours to complete building samples 44.

After the post-processing samples 44 in an oven, the samples were left for a day in a room temperature environment and the following mechanical parameters then measured: tensile strength, elongation at break, and tensile modulus. These measurements were made using a MTS testing machine (System Type: Qtest-ADC) from MTS systems corporation, Eden Prairie, Minn.

The dispensing device, such as dispensing device 24 of FIG. 1 or 3, of certain embodiments of the present invention is a print head comprising four rows of 112 raster lines (not shown in FIG. 1 or 3) capable of printing two 112 raster lines of support material 31 and two 112 raster lines of build material 30 during one pass across the build environment 12 in the X-direction. Therefore, one pass of dispensing device 24 in the X-direction forms 224 parallel lines of each type of material. After one pass in the X-direction, dispensing device 24 is repositioned in the Y-direction by approximately 0.078 millimeters such that on the return pass in the X-direction, an additional 224 raster lines are created. This process continues for a total of 12 passes, resulting in a completely filled layer of material approximately 188 millimeters wide. CW UV curing system 36 moves along the X-axis via rail system 18. The height H of array 100 is adjusted via the actuation device 16 in the manner described above. The single-exposure time for each layer 28 was at least one second (the exact exposure time depends upon a number of parameters, including but not limited to the cross-sectional area of the build material to be cured and the speed of the platform). The UV LEDs 38 were turned off between exposures; however, alternative embodiments of the present invention may permit the UV LEDs to remain on between exposures. Such alternative embodiments may further include a shutter or similar to device to ensure that the build material on the planarizer and/or dispensing device is not exposed to the radiation from the UV LEDs. Still further embodiments of the present invention may cure two or more layers of build material with a single-exposure or multiple exposures.

During post-processing, support material 31 is removed by heating the resulting structure in an oven at approximately 70° C. so as to melt the support material. The support material 31 of the illustrated embodiments is a non-reactive material that is solid at room temperature. It contains solid wax-like compounds, is easily removed by low heat or solvent, and has good adhering properties to the machine platform and to the model material. At the dispensing ("jetting") temperature, the support material 31 is a liquid with low viscosity and it is planarizable. In addition, the support material 31 has a similar melting and freezing point in order to be jetted at the same temperature and process parameters as the model material 30. The curing materials used were SR200 Neutral color currently being used in the ProJet™ 3-D modelers available from 3D Systems, Inc., Rock Hill, S.C.

Figure 11A:
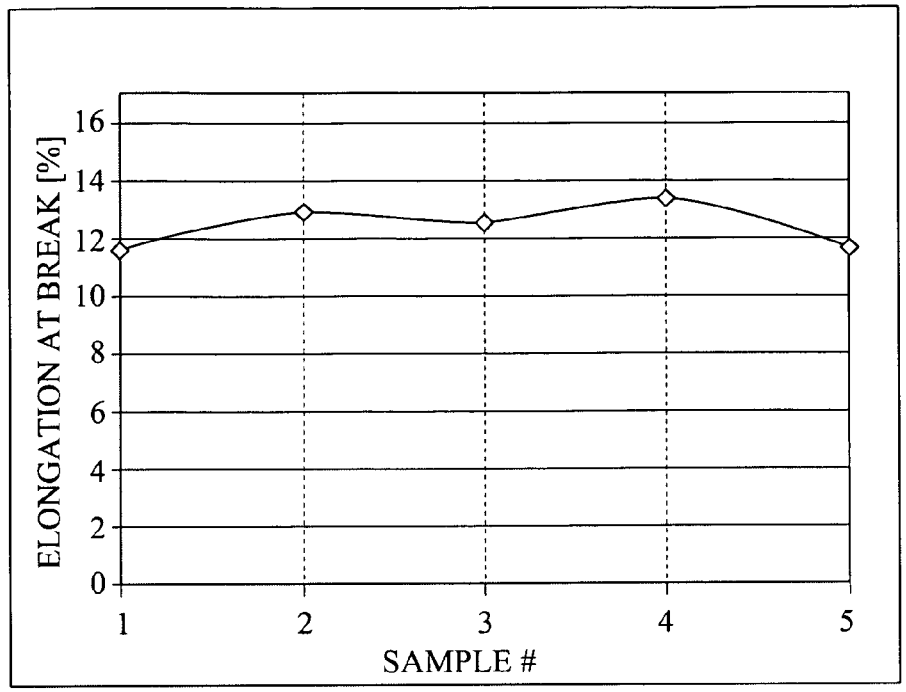
FIG. 11A is a plot of elongation at break (%) as a function of sample number for the CW UV curing system of the present invention.
Figure 11B:
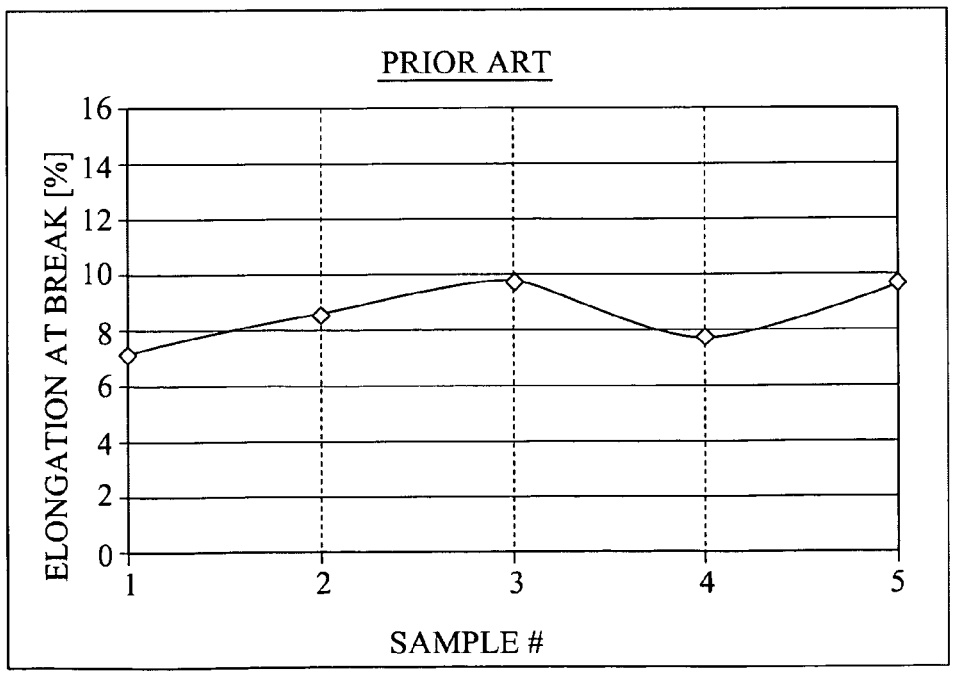
FIG. 11B is a plot of elongation at break (%) as a function of sample number for a prior art Xenon-lamp-based curing system.
Figure 11C:
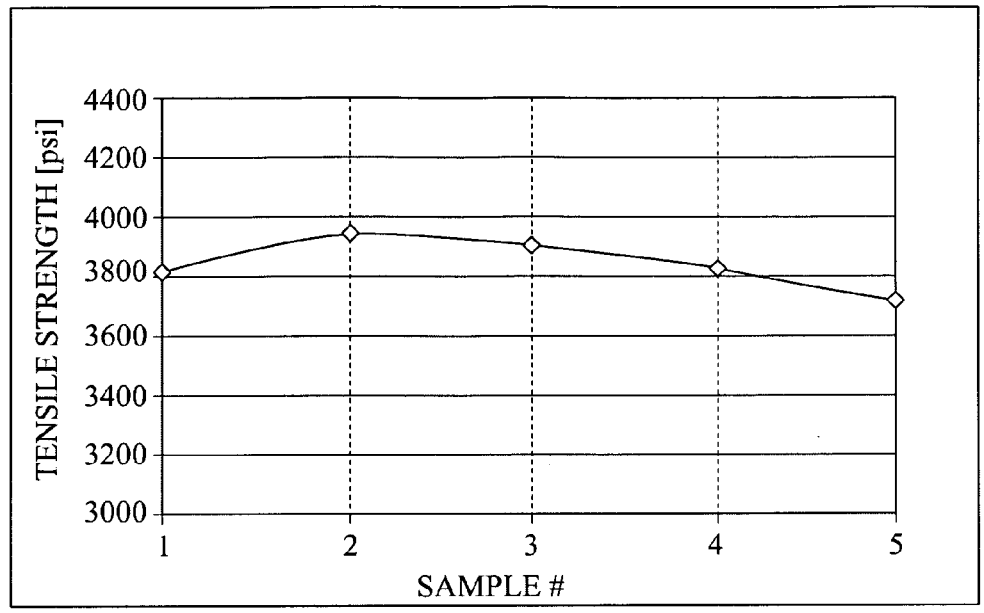
FIG. 11C is a plot of the tensile strength (psi) as a function of sample number for the CW UV curing system of the present invention.
Figure 11D:
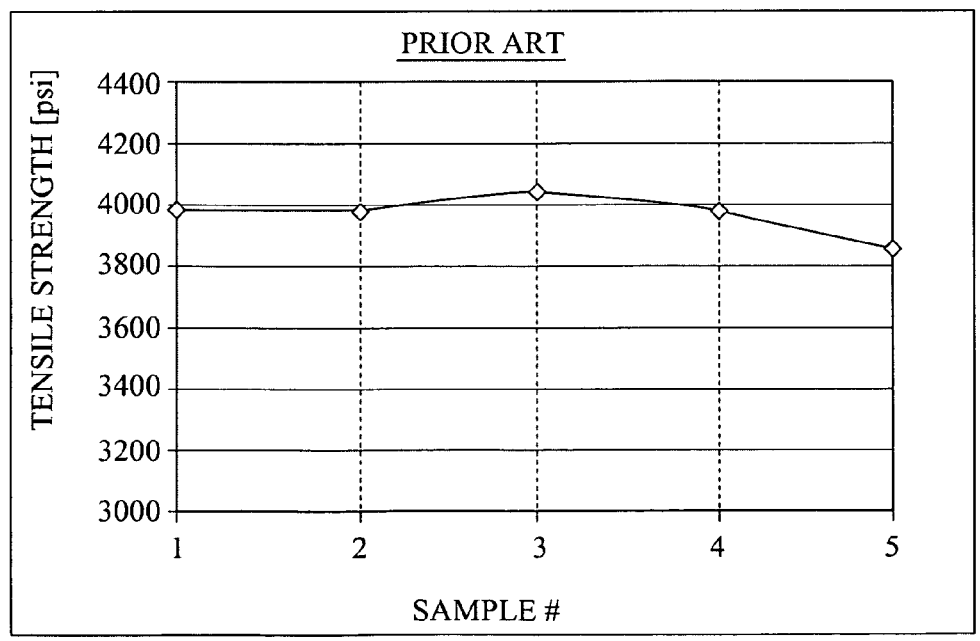
FIG. 11D is a plot of tensile strength (psi) as a function of sample number for a prior art Xenon-lamp-based curing system.
Figure 11E:
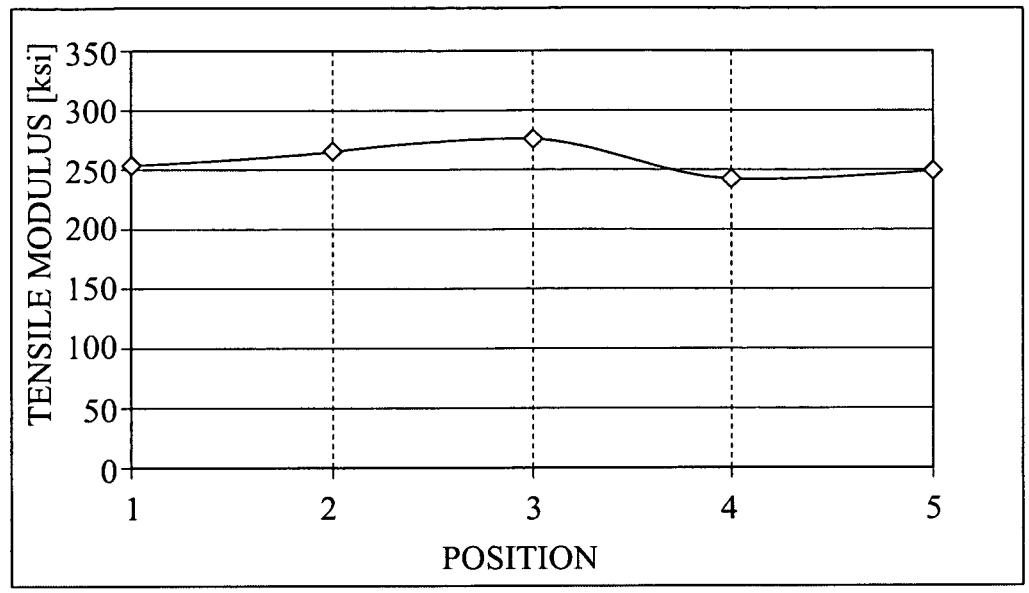
FIG. 11E is a plot of the tensile modulus (ksi) as a function of sample number for the CW UV curing system of the present invention.
Figure 11F:
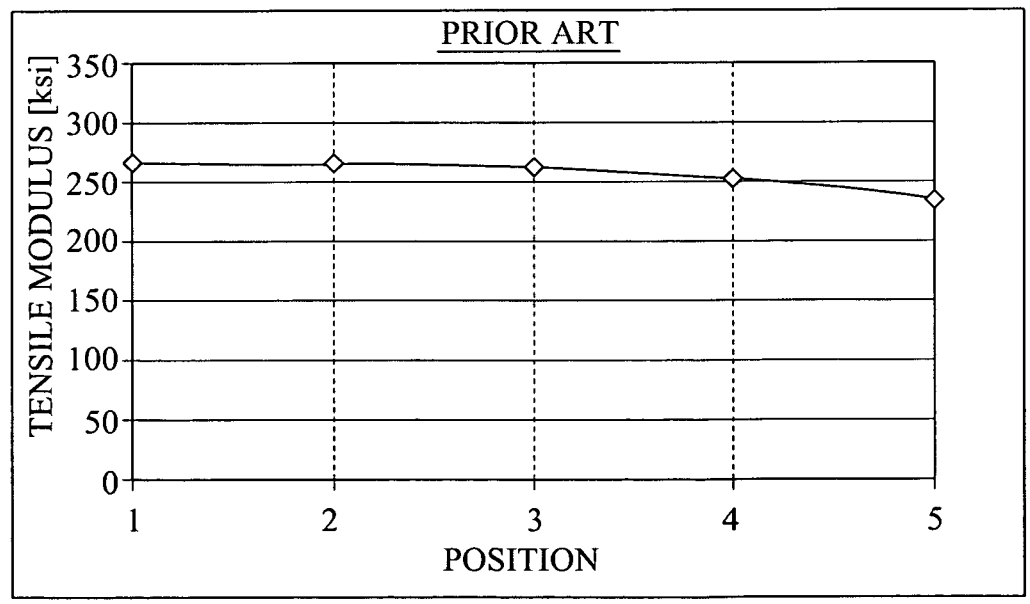
FIG. 11F is a plot of tensile modulus (ksi) as a function of sample number for a prior art Xenon-lamp-based curing system.

FIG. 11A is a plot of elongation at break (%) as a function of sample number for the CW UV curing system of the present invention while FIG. 11B is a plot of elongation at break (%) as a function of sample number for five samples using a prior art Xenon-lamp-based curing. The average "elongation at break" of the five samples (each sample being the average of four data points) cured by UV LEDs 38 is 12.5% while that by the Xenon lamp is 8.6%. A higher elongation together with the proper tensile strength and modulus means the model is more flexible, which is generally more desirable. The tensile strengths and tensile moduli of the samples as cured by the UV-LEDs 38 (FIGS. 11C, 11E) and the Xenon lamp (FIGS. 11D, 11F) and were found to be similar to within experimental error.

Three-dimensional objects 44 of certain embodiments of the present invention are formed by exposing each new layer 28 to a single exposure from CW UV curing system 36. Because the CW UV curing system 36 does not continuously remain on during the formation of the object, a significant amount of energy savings is achieved as well as a significant reduction in heat generation.

When curing the build material with the CW UV curing system 36, only photons in the short wavelength band, generally between about 200 nm to about 400 nm initiates curing since the selected photo-initiator I-184 releases free radicals only when exposed to the short wavelength band. Although the system is less efficient with short wavelength band photoinitiators, these photoinitiators are generally desirable because they tend to be more thermally stable. However, the CW UV curing system 36 is well suited for use in curing other formulations containing photoinitiators that are excitable in the longer wavelength band UV-A, between about 300 nm to about 400 nm, such as the 1-369 photoinitiator available from Ciba Specialty Chemicals, Inc. of New York, N.Y. Further, these and other photoinitiators can be combined to formulate a material wherein cure is initiated for wavelengths in the entire UV band, for example between about 200 nm to about 400 nm, if desired.

Figure 12:
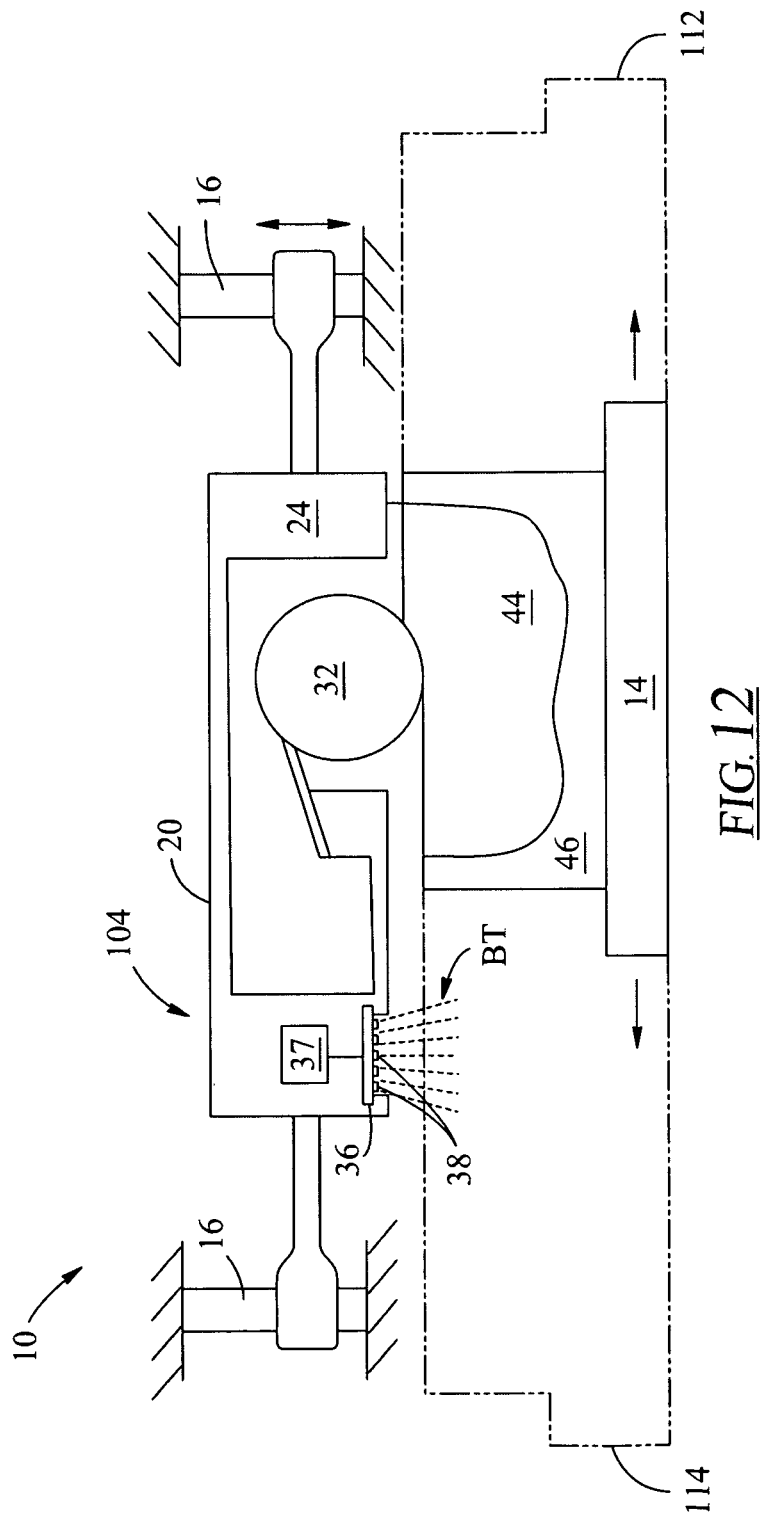
FIG. 12 is a diagrammatic side view of an example of the SDM apparatus of FIG. 3 that includes the CW UV curing system of the present invention.

Referring now to FIG. 12, the CW UV curing system 36 is shown schematically in cross-section along with the dispensing device 24 and the planarizer 32 mounted on the dispensing trolley 20 in operative association with the reciprocating build platform 14 of the SDM apparatus 10 previously discussed in conjunction with FIG. 3. The Z850 print head dispensing device 24 has an array of 448 dispensing jets divided into 112 banks, each bank having four jets. For each bank, two jets are configured to dispense the build material and the other two are configured to dispense the support material. There are a total of 2,688 raster lines required to cover the width of the dispensing area for the apparatus, which is 187.96 millimeters. With a total of 2688 raster lines that the print head must cover to form a layer, each bank of four jets is assigned to dispense over 24 raster lines (2688/112). For each column of four jets to cover the 24 raster lines assigned to it, the print head is shifted in the direction normal to the plane of the cross-sectional view of FIG. 12 a distance of one raster line at the end of reciprocation of the build platform 14, whose end locations are shown by numerals 112 (right) and 114 (left). Thus, it takes 12 reciprocal passes of the build platform 14 under the print head so that all 2688 raster lines can be dispensed with either build material or support material by the print head to form a layer.

It is to be appreciated that in the illustrated embodiment planarizing only occurs when the build platform reciprocates in one direction, such as from left to right in FIG. 12. Hence, planarizing occurs on every other reciprocal pass so that each layer is planarized six times. The CW UV curing system 36 will then reside on the side where planarization of the object 44 has already occurred, which in FIG. 12 is on the left. Because the build platform 14 must reciprocate 12 times for a complete layer to be dispensed, the CW UV curing system 36 provides its single exposure only when the build platform has returned to the left side. The exposure can occur either as the build platform moves from right to left towards the left end of reciprocation 114, or after the build platform reaches the left end of reciprocation 114 and starts to move from left to right. The CW UV curing system 36 can be selectively configured to perform its single exposure per layer at any desired interval with regard to the 12 reciprocal passes of the build platform.

In certain embodiments of the present invention, it takes approximately 24 seconds to dispense a layer of material with the SDM apparatus, such as an apparatus discussed in conjunction with FIGS. 3 and 12. If the CW UV curing system 36 performs a single exposure when forming a layer, the exposure can be anywhere from between about 1.7 seconds to about 14 seconds (typically at least one second or longer), depending upon a number of factors, including the surface area of the build material being cured, the speed of the platform, the number of layers being cured, and the like, as generally described above.

Example SDM Apparatus

Figure 13:
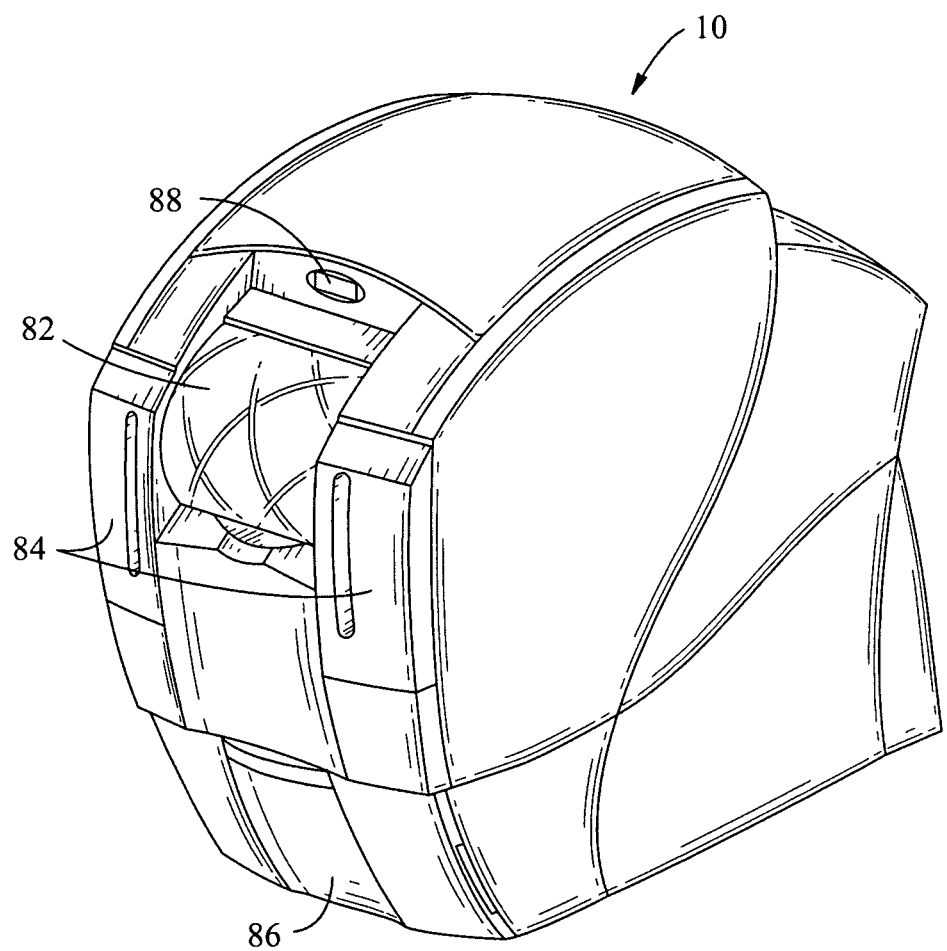
FIG. 13 is an isometric view of an example embodiment of the SDM apparatus of FIG. 3.

Now referring to FIG. 13, the SDM apparatus schematically shown in FIG. 3 is shown as 12. To access the build environment, a slideable door 82 is provided at the front of the apparatus. The door 82 does not allow radiation within the apparatus to escape into the environment. The apparatus is configured such that it will not operate or turn on with the door 82 open. In addition, when the apparatus is in operation, the door 82 will not open. Material feed doors 84 are provided so that the curable phase change material can be inserted into the apparatus through one door 84 and the non-curable phase change material can be inserted into the apparatus through the other into their respective feed magazines (not shown). A waste drawer 86 is provided at the bottom end of the apparatus 10 so that the expelled waste material can be removed from the apparatus. A user interface 88 is provided which is in communication with the external computer previously discussed which tracks receipt of the print command data from the external computer.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A selective deposition modeling (SDM) apparatus for forming a three-dimensional object from a build material in a build environment, the apparatus receiving, from a computer, computer data corresponding to layers of the three-dimensional object, the apparatus comprising:
   a platform configured to support the three-dimensional object in the build environment;
   a dispensing device comprising an ink jet print head arranged relative to the platform and configured to jet the build material and a support material in the build environment according to the computer data to form the layers of the three-dimensional object from the build material, wherein the build material is a different material than the support material; and
   one or more non-pulsed continuous-wave (CW) ultraviolet (UV) light-emitting diodes (LEDs) disposed relative to the platform and configured to irradiate the layers with UV radiation that initiates curing of at least the build material, wherein the one or more non-pulsed CW UV LEDs does not substantially produce infrared OR) radiation.

2. A SDM apparatus in accordance with claim 1, wherein the one or more non-pulsed CW UV LEDs has central wavelength of between 200 nm and 410 nm.

3. A SOM apparatus in accordance with claim 1, wherein the one or more non-pulsed CW UV LEDs includes a plurality of non-pulsed CW UV LEDs arranged in an array.

4. A SDM apparatus in accordance with claim 1, wherein the amount of irradiance from the one or more non-pulsed CW UV LEDs ranges from about 10 mW/cm$^2$ to about 100 mW/cm$^2$.

5. A SDM apparatus in accordance with claim 1, wherein the one or more non-pulsed CW UV LEDs comprises two or more LEDs connected to two or more modules that include at least one LED.

6. A SDM apparatus in accordance with claim 1, further comprising at least one power detector that indirectly measures the UV radiation emitted by the one or more non-pulsed CW UV LEDs.

7. A SDM apparatus in accordance with claim 1, wherein the dispensing device jets a non-curable phase change support material.

8. A SDM apparatus in accordance with claim 1, wherein the dispensing device jets a thermoplastic phase change support material.

* * * * *